US008743955B2

(12) United States Patent
Kim et al.

(10) Patent No.: US 8,743,955 B2
(45) Date of Patent: Jun. 3, 2014

(54) METHOD, MEDIUM, AND APPARATUS FOR ENCODING AND/OR DECODING VIDEO BY GENERATING SCALABLE BITSTREAM WITH ADAPTIVE BIT-DEPTH AND VIDEO FORMAT

(75) Inventors: Dae-hee Kim, Suwon-Si (KR); Dae-sung Cho, Seoul (KR); Woong-il Choi, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1354 days.

(21) Appl. No.: 12/213,017

(22) Filed: Jun. 12, 2008

(65) Prior Publication Data

US 2009/0110054 A1    Apr. 30, 2009

(30) Foreign Application Priority Data

Oct. 24, 2007  (KR) .................. 10-2007-0107430

(51) Int. Cl.
*H04N 7/12*  (2006.01)
*H04N 11/02* (2006.01)
*H04N 7/26*  (2006.01)

(52) U.S. Cl.
CPC .... *H04N 19/00321* (2013.01); *H04N 19/00436* (2013.01)
USPC .................. 375/240.1; 375/240.03

(58) Field of Classification Search
CPC .............. H04N 19/00321; H04N 19/00436
USPC ........................ 375/240.01, 240.1
IPC ........................................ H04N 7/26
See application file for complete search history.

(56) References Cited

U.S. PATENT DOCUMENTS 5,325,124 A    6/1994  Keith 6,195,390 B1 *  2/2001  Hashino et al. .......... 375/240.21
(Continued)

FOREIGN PATENT DOCUMENTS

EP          1542476 A2      6/2005
JP          2007-266749     10/2007
(Continued)

OTHER PUBLICATIONS

PCT International Search Report for corresponding PCT International Application No. PCT/KR2008/003918 dated Jan. 7, 2009, 7 pgs (in English).
(Continued)

*Primary Examiner* — Richard Torrente
(74) *Attorney, Agent, or Firm* — Staas & Halsey LLP

(57) ABSTRACT

A method, medium, and apparatus for encoding and/or decoding video by generating a scalable bitstream formed with a base layer bitstream and an enhancement layer bitstream, in order to provide forward compatibility, is described. The method includes reconstructing an image having an extended bit-depth and an extended video format into an image having a base bit-depth and a base video format, encoding the reconstructed image, and as a result of the encoding of the image having the base bit-depth and the base video format, generating a base layer bitstream, and reconstructing the image having the extended bit-depth and extended video format into an image having the extended bit-depth and the base video format, and by using the result of the encoding of the image having the base bit-depth and the base video format, encoding the image having the extended bit-depth and the base video format, and generating an enhancement layer bitstream with a result of the encoding of the image having the extended bit-depth and the base video format and additional data required for the extended video format.

11 Claims, 20 Drawing Sheets

(56) References Cited

U.S. PATENT DOCUMENTS

| | | | |
|---|---|---|---|
| 2004/0022318 A1* | 2/2004 | Garrido et al. | 375/240.11 |
| 2005/0010404 A1* | 1/2005 | Son et al. | 704/219 |
| 2005/0094726 A1* | 5/2005 | Park | 375/240.08 |
| 2005/0259729 A1* | 11/2005 | Sun | 375/240.1 |
| 2008/0002767 A1* | 1/2008 | Schwarz et al. | 375/240.12 |
| 2008/0025397 A1* | 1/2008 | Zhao et al. | 375/240.13 |
| 2008/0056352 A1 | 3/2008 | Kim et al. | |
| 2008/0075166 A1* | 3/2008 | Gish et al. | 375/240.13 |

FOREIGN PATENT DOCUMENTS

| | | | |
|---|---|---|---|
| WO | WO 2006/093383 A1 | 9/2006 | |
| WO | WO 2008/049446 A1 | 2/2008 | |

OTHER PUBLICATIONS

European Search Report for corresponding European Patent Application No. 08778582 dated Nov. 18, 2011 (in English).

Erdem et al., "Compression of 10-bit video using the tools of MPEG-2", Signal Processing: Image Communication 7, Elsevier Science Publishers, 1995, pp. 27-56 (in English).

Amon et al., "SNR Scalable Layered Video Coding", Siemens Corporate Technology, XP-002221865, Apr. 24, 2002, pp. 1-8 (in English).

Winken et al., "BIT-Depth Scalable Video Coding", Image Processing, IEEE, 2007, pp. I-5-I-8 (in English).

Symes., "Ten-Bit Processing in an 8-bit Environment", SMPTE Journal, XP000033810, White Plains, NY, Jun. 28, 1989, pp. 444-445 (in English).

* cited by examiner

METHOD, MEDIUM, AND APPARATUS FOR ENCODING AND/OR DECODING VIDEO BY GENERATING SCALABLE BITSTREAM WITH ADAPTIVE BIT-DEPTH AND VIDEO FORMAT

CROSS-REFERENCE TO RELATED APPLICATIONS

This application claims the benefit of Korean Patent Application No. 10-2007-0107430, filed on Oct. 24, 2007, in the Korean Intellectual Property Office, the disclosure of which is incorporated herein in its entirety by reference.

BACKGROUND

1. Field

One or more embodiments of the present invention relate to a video encoding apparatus and method and a video decoding apparatus and method, and more particularly, to a video encoding apparatus and method and a video decoding apparatus and method in which a scalable bitstream supporting at least one encoding parameter from among at least two bit-depths and at least two video formats, and having forward compatibility, is generated or decoded.

2. Description of the Related Art

In an ordinary video codec according to conventional technology, when the bit-depth of a basic encoder such as a VC-1 encoder, is changed from 8 bits to 10 bits, or when the video format of a basic encoder is simply changed from 4:2:0 to 4:2:2 or 4:4:4, it is impossible for a VC-1 decoder to read a bitstream which is generated by the improved encoders having the extended bit-depth or the changed video format and reproduce video. Recently, the necessity for development of a video codec which guarantees forward compatibility and allows a VC-1 decoder and other improved decoders to restore a video from a bitstream encoded with a variety of bit-depths or video formats, as well as a fixed bit-depth or fixed video format, has been increasingly highlighted.

That is, since a new video codec, which does not guarantee forward compatibility, cannot support a terminal having only a conventional basic video codec, reuse of digital content in terminals having different specifications from each other becomes impossible. In addition, it will take a great deal of time for the new video codec to settle into the market, because the new video codec needs to overcome the already established conventional video codec market.

SUMMARY

One or more embodiments of the present invention provide a video encoding apparatus and method in which a scalable bitstream formed with a base layer bitstream and an enhancement layer bitstream is generated so that the scalable bitstream can support at least one encoding parameter from among at least two bit-depths and at least two video formats, and have forward compatibility.

One or more embodiments of the present invention also provide a video decoding apparatus and method in which a scalable bitstream formed with a base layer bitstream and an enhancement layer bitstream is decoded so that the scalable bitstream can support at least one encoding parameter from among at least two bit-depths and at least two video formats, and have forward compatibility.

Additional aspects and/or advantages will be set forth in part in the description which follows and, in part, will be apparent from the description, or may be learned by practice of the invention.

According to an aspect of the present invention, there is provided a video encoding method of generating a scalable bitstream formed with a base layer bitstream and an enhancement layer bitstream in order to provide forward compatibility, the method including: reconstructing an image having an extended bit-depth and an extended video format into an image having a base bit-depth and a base video format, encoding the reconstructed image, and as a result of the encoding the image having the base bit-depth and the base video format, generating a base layer bitstream; and reconstructing the image having the extended bit-depth and extended video format into an image having the extended bit-depth and the base video format, and by using the result of the encoding the image having the base bit-depth and the base video format, encoding the image having the extended bit-depth and the base video format, and generating an enhancement layer bitstream with the result of the encoding the image having the extended bit-depth and the base video format and additional data required for the extended video format.

According to another aspect of the present invention, there is provided a video encoding apparatus for generating a scalable bitstream formed with a base layer bitstream and an enhancement layer bitstream in order to provide forward compatibility, the apparatus including: a base layer encoding module reconstructing an image having an extended bit-depth and an extended video format into an image having a base bit-depth and a base video format, encoding the reconstructed image, and as the result of the encoding the image having the base bit-depth and the base video format, generating a base layer bitstream; and an enhancement layer encoding module reconstructing the image having the extended bit-depth and extended video format into an image having the extended bit-depth and the base video format, and by using the result of the encoding the image having the base bit-depth and the base video format, encoding the image having the extended bit-depth and the base video format, and generating an enhancement layer bitstream with the result of the encoding the image having the extended bit-depth and the base video format and additional data required for the extended video format.

According to another aspect of the present invention, there is provided a video decoding method of decoding a scalable bitstream formed with a base layer bitstream and an enhancement layer bitstream in order to provide forward compatibility, the method including: generating a base restoration image, by decoding an image having a base bit-depth and a base video format extracted from a base layer bitstream in the scalable bitstream; and decoding image compression data having an extended bit-depth and a base video format extracted from an enhancement layer bitstream in the scalable bitstream by using the result of the decoding of the base layer bitstream, and extracting and decoding additional data required for the extended video format from the enhancement layer bitstream, and thereby generating an enhancement restoration image.

According to another aspect of the present invention, there is provided a video decoding apparatus for decoding a scalable bitstream formed with a base layer bitstream and an enhancement layer bitstream in order to provide forward compatibility, the apparatus including: a base layer decoding module generating a base restoration image, by decoding an image having a base bit-depth and a base video format extracted from a base layer bitstream in the scalable bitstream; and an enhancement layer decoding module decoding image compression data having an extended bit-depth and a base video format extracted from an enhancement layer bitstream in the scalable bitstream by using the result of the decoding of the base layer bitstream, and extracting and decoding additional data required for the extended video format from the enhancement layer bitstream, and thereby generating an enhancement restoration image.

A video encoding apparatus according to the present invention generates a scalable bitstream formed with a base layer bitstream and an enhancement layer bitstream. A conventional basic decoder which receives the scalable bitstream performs decoding by using a base layer bitstream obtained from the scalable bitstream. A video decoding apparatus according to the present invention performs decoding by using both the base layer bitstream and the enhancement layer bitstream. In this way, the video codec according to the present invention can harmonize and thereby coexist with conventional video codecs, and as a result, the video compression method according to the present invention can be easily employed in the already established conventional video codec market.

According to another aspect of the present invention, there is provided a computer readable medium having computer readable code to implement a video encoding method of generating a scalable bitstream formed with a base layer bitstream and an enhancement layer bitstream in order to provide forward compatibility, the method comprising: reconstructing an image having an extended bit-depth and an extended video format into an image having a base bit-depth and a base video format, encoding the reconstructed image, and as a result of the encoding of the image having the base bit-depth and the base video format, generating a base layer bitstream; and reconstructing the image having the extended bit-depth and extended video format into an image having the extended bit-depth and the base video format, and by using the result of the encoding of the image having the base bit-depth and the base video format, encoding the image having the extended bit-depth and the base video format, and generating an enhancement layer bitstream with a result of the encoding of the image having the extended bit-depth and the base video format and additional data required for the extended video format.

According to another aspect of the present invention, there is provided a computer readable medium having computer readable code to implement a video decoding method of decoding a scalable bitstream formed with a base layer bitstream and an enhancement layer bitstream in order to provide forward compatibility, the method comprising: generating a base restoration image, by decoding an image having a base bit-depth and a base video format extracted from a base layer bitstream in the scalable bitstream; and decoding image compression data having an extended bit-depth and a base video format extracted from an enhancement layer bitstream in the scalable bitstream by using a result of decoding the base layer bitstream, and extracting and decoding additional data required for the extended video format from the enhancement layer bitstream, thereby generating an enhancement restoration image.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
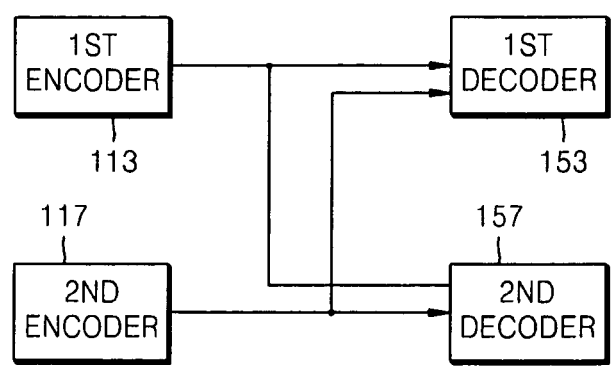
FIG. 1 explains the concept of a video encoding apparatus and a video decoding apparatus, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 explains the concept of a video encoding apparatus and a video decoding apparatus, according to an embodiment of the present invention. As an encoder part, examples of a first encoder 113 performing the role of a basic encoder and a second encoder 117 performing the role of an improved encoder will be explained. As a decoder part, examples of a first decoder 153 performing the role of a basic decoder and corresponding to the first encoder 113, and a second decoder 157 performing the role of an improved decoder and corresponding to the second encoder 117 will be explained. In an embodiment of the present invention, the first encoder 113 generates a bitstream according to a base bit-depth and a first video format, and the second encoder 117 generates a scalable bitstream supporting the base bit-depth and an extended bit-depth and complying with the first video format. In another embodiment of the present invention, the first encoder 113 generates a bitstream according to the base bit-depth and the first video format, and the second encoder 117 generates a scalable bitstream supporting the first video format and a second video format and complying with the base bit-depth. In still another embodiment of the present invention, the first encoder 113 generates a bitstream according to the base bit-depth and the first video format, and the second encoder 117 generates a bitstream supporting the base bit-depth and the extended bit-depth, and the first and second video formats, or a bitstream supporting the base bit-depth and the extended bit-depth and the first video format and a third video format. That is, the second encoder 117 generates a scalable bitstream which can support forward compatibility with at least one from among encoding parameters including bit-depths and video formats, and corresponding to this, the second decoder 157 decodes a scalable bitstream or a non-scalable bitstream.

For convenience of explanation, an example will be given, in which a base bit-depth is 8 bits, an extended bit-depth is 10 bits, a first video format is 4:2:0, a second video format is 4:2:2, and a third video format is 4:4:4. According to the example, a VC-1 encoder supporting an 8-bit bit-depth and a 4:2:0 video format may be employed as the first encoder 113.

Referring to FIG. 1, a bitstream 131 generated in the first encoder 113 can be decoded in the second decoder 157 as well as in the first decoder 153. A scalable bitstream 137 generated by the second encoder 117 can be decoded by the second decoder 157. In the first decoder 153, a base layer bitstream in the scalable bitstream 137 can be decoded in a state in which an enhancement layer bitstream included in the scalable bitstream 137 is ignored. The second encoder 117, which is capable of providing this forward compatibility, corresponds to a scalable video encoding apparatus of the present invention, while the second decoder 157 corresponds to a scalable video decoding apparatus of the present invention.

First, a process of obtaining a scalable bitstream by extending a bit-depth among encoding parameters will now be explained with reference to FIG. 1.

In an example in which the first encoder 113 is an 8-bit encoder and the second encoder 117 is an N-bit encoder, a start code of a picture level of an enhancement layer bitstream in a scalable bitstream obtained from the second encoder 117 is used in order to express a remaining part of an extended bit-depth which the first encoder 113 cannot express. First, when the extended bit-depth is N bits, the extended quantization parameter is referred to as $QP_N$ and when the base bit-depth is 8 bits, the base quantization parameter is referred to as $QP_8$. If an original image whose bit-depth is N bits is encoded in a video codec whose bit-depth is 8 bits, the relationship between the two quantization parameters is as given by Equation 1 below.

$$QP_N = QP_8 \times 2^{(N-8)} \quad \text{Equation 1}$$

That is, the dynamic range of the result obtained by quantizing the N-bit original image with the extended quantization parameter $QP_N$ should be the same as the dynamic range of the result obtained by quantizing the base quantization parameter $QP_8$. By making the dynamic ranges identical, without any particular change in the video codecs, the N-bit original image can be encoded and decoded in the conventional method. However, in this case, the quality of an image restored from the N-bit original image is no different from the quality of an image restored from an 8-bit original image, and therefore advantages of the N-bit original image are lost.

In order to improve this, in the case of an N-bit original image, it can be expressed as given by Equation 2 below, using a base quantization parameter $QP_N$, and a refined quantization parameter (R) which is an embodiment of additional quantization information. In this case, the extended quantization parameter $QP_N$ or the base quantization parameter $QP_8$ is derived from "PQINDEX" in the case of a VC-1 encoder. By using the refined quantization parameter (R), a smaller extended quantization parameter than the base quantization parameter can be permitted.

$$QP_N = QP_8 2^{(N-8)} + R \quad \text{Equation 2}$$

In an embodiment, R has a value in a range [−3, 0]. In this case, if $QP_8$ has a value in a range [1, 31], $QP_N$ has a value in a range [1, $2^{(N-8)} \times 31$]. That is, if a base quantization parameter $QP_N$ is given in relation to a refined quantization parameter (R) having a predetermined range, an extended quantization parameter $QP_N$ and the refined quantization parameter (R) can be calculated. In this case, although the minimum values of the base quantization parameter $QP_8$ and the extended quantization parameter $QP_N$ are identical and equal to 1, a high contrast ratio can be provided using a relatively small value for the extended quantization parameter $QP_N$.

The data obtained by quantizing the N-bit original image using the quantization parameter of Equation 1 forms a base layer bitstream, and the data obtained by quantizing the N-bit original image using the quantization parameter of Equation 2 forms an enhancement layer bitstream. By combining the two bitstreams, a scalable bitstream is generated. In this case, in order to reduce the amount of data which is transmitted as an enhancement layer bitstream, an enhancement layer bitstream can be formed from a quantization level which is predicted from a quantization level used for a base layer bitstream. This scalable bitstream can be decoded both by an N-bit decoder as well as by a conventional 8-bit decoder.

A process of obtaining a scalable bitstream by extending a video format among encoding parameters will now be explained with reference to FIG. 1.

When the video formats of the first encoder 113 and the second encoder 117 are different from each other, a concept of spatial scalability is applied to form a scalable bitstream. For example, when the video format supported by the first encoder 113 and the first decoder 153 is 4:2:0 and the video format supported by the second encoder 117 and the second decoder 157 is 4:2:2, filtering of a chrominance component in a 4:2:2 image is performed, thereby dividing the chrominance component into a low frequency band value and a high frequency band value. Then, by using the chrominance component of the low frequency band value, a 4:2:0 image is reconstructed with a luminance component. Meanwhile, without performing the filtering, a 4:2:0 image can be reconstructed by performing down-sampling of a chrominance component. The reconstructed 4:2:0 image is encoded in, for example, a 4:2:0 video encoder such as the first encoder 113, included in the second encoder 117, and forms a base layer bitstream as 4:2:0 compression data. Meanwhile, in the 4:2:2 video encoder included in the second encoder 117, a chrominance image formed by the chrominance component of the high frequency band value is encoded, thereby forming an enhancement layer bitstream. As another example, when the video format supported by the first encoder 113 and the first decoder 153 is 4:2:0 and the video format supported by the second encoder 117 and the second decoder 157 is 4:4:4, the same principle is also applied. When a base layer bitstream and an enhancement layer bitstream are generated, a coded block pattern (CBP) may be encoded together with the base layer bitstream and the enhancement layer bitstream. The CBP, which is used when a base layer bitstream is generated, is formed by 6 bits for a 4:2:0 video format, 8 bits for a 4:2:2 video format, and 12 bits for a 4:4:4 video format. Meanwhile, a CBP which is used when an enhancement layer bitstream is generated is formed by 2 bits for a 4:2:2 video format and 4 bits for a 4:4:4 video format, because an encoding process is performed in relation to only a chrominance image.

Meanwhile, a scalable bitstream obtained from a video encoding apparatus of the present invention is constructed by combining a base layer bitstream generated through a base layer encoding module 210 and an enhancement layer bitstream generated through an enhancement layer encoding module 230. Basically, a sequence header (Base SEQ_HDDR) of a lower layer, i.e., a base layer, is located before a sequence header (Enhancement SEQ_HDDR) of an upper layer, i.e., an enhancement layer. A frame or picture header (Base PIC_HDDR) of a base layer and frame or picture data (Base PIC_DATA) of a base layer are respectively located after the sequence header of each layer, and then, a frame or picture header (Enhancement PIC_HDDR) of an enhancement layer and frame or picture data (Enhancement PIC_DATA) are respectively located. In this case, the frame or picture header and frame or picture data of each layer repeatedly appear up to the last frame or picture included in one video sequence. In the scalable bitstream according to an embodiment of the present invention, a variety of user data or entry-point information or group of pictures (GOP) information may be further included in a predetermined location. Meanwhile, in another embodiment, an enhancement layer may be located before a base layer in relation to a frame or picture header. Here, detailed explanations of a sequence header (Base SEQ_HDDR), a frame or picture header (Base PIC_HDDR), a frame or picture header (Base PIC_HDDR) and frame or picture data (Base PIC_DATA) of a base layer forming a base layer bitstream will be omitted because these are the same as in the conventional video codecs.

Table 1 below explains areas for loading information related to an enhancement layer, including an enhancement layer identifier, in a scalable bitstream obtained from a video encoding apparatus according to embodiments of the present invention. When the first encoder 113 is a VC-1 encoder, a start code of 4 bytes may be used in an embodiment of the present invention. In the case of the VC-1 encoder, a start code can be supported from an advanced profile or higher. Meanwhile, a start code may be included in the first area of a header of each level.

TABLE 1

| Start-CODE Suffix | BDU Type |
| --- | --- |
| 0x00 | SMPTE Reserved |
| 0x01-0x09 | SMPTE Reserved |
| 0x0A | end-of-Sequence |
| 0x0B | Slice |
| 0x0C | Field |
| 0x0D | Frame |
| 0x0E | Entrypoint Header |
| 0x0F | Sequence Header |
| 0x10-0x1A | SMPTE Reserved |
| 0x1B | Slice Level User Data |
| 0x1C | Field Level User Data |
| 0x1D | Frame Level User Data |
| 0x1E | Entry-point Level User Data |
| 0x1F | Sequence Level User Data |
| 0x20-40, 0x41-0x7F | SMPTE Reserved |
| 0x80-0xFF | Forbidden |

Referring to table 1, a process of loading information related to an enhancement layer in a start code of the VC-1 used in an embodiment of the present invention will now be explained. Among bitstream data unit (BDU) types defined in a suffix in a start code, reserved areas reserved for future use are used for loading information related to the enhancement layer. Here, the BDU refers to a compression data unit that can be parsed independently of other information items in an identical layer level. For example, the BDU may be a sequence header, an entry point header, an encoded picture or a slice. Among the BDU types defined in the suffix of the start code, the remaining areas excluding a forbidden area are for loading information related to a base layer. Here, the start code is only an example, and other parts in the elements of a bitstream may also be used. Here, it is assumed that '0x00' is a first reserved area, '0x01-0x09' is a second reserved area, '0x10-0x1A' is a third reserved area, and '0x20-0x40' is a fourth reserved area.

Meanwhile, an enhancement layer includes a sequence level, a GOP level, a frame level, a field level, and a slice level. According to an embodiment of the present invention, information of the enhancement layer may be included in one of the second reserved area and the fourth reserved area. More specifically, a start code is included in a header for a sequence level of the enhancement layer as '0x09' in the second reserved area or '0x40' in the fourth reserved area. A start code is included in a header for a GOP level of the enhancement layer as '0x08' in the second reserved area or '0x3F' in the fourth reserved area. A start code is included in a header for a frame level of the enhancement layer as '0x07' in the second reserved area or '0x3E' in the fourth reserved area. A start code is included in a header for a field level of the enhancement layer as '0x06' in the second reserved area or '0x3D' in the fourth reserved area. A start code for enhancement chrominance data is included in a header for enhancement layer data as '0x06' in the second reserved area or '0x3C' in the fourth reserved area.

This will now be explained in more detail.

Examples of Information items that can be included in the start code of the header for the enhancement layer sequence level, which is defined as '0x09' in the second reserved area, include information on an additional profile and level that can be achieved by the enhancement layer in addition to a base layer, and information on a bit-depth. More specifically, in the sequence level of the base layer, a profile is defined by 2 bits, '3' indicates an advanced profile and '0-2' indicates a reserved area. Meanwhile, a level is defined by 3 bits, '000' indicates AP@L0, '001' indicates AP@L1, '010' indicates AP@L2, '011' indicates AP@L3, '100' indicates AP@L4, and '101-111' indicates a reserved area. Information on a bit-depth that can be achieved by the enhancement layer can be expressed by a value from "N−8" (where N is the bit-depth of the enhancement layer). According to the bit-depth of the first encoder 113 illustrated in FIG. 1 corresponding to the base layer, a value other than 8 can be used. Meanwhile, N may be used without any change as bit-depth information that can be achieved by an enhancement layer. Also, enhanced video format information may be included as information on an enhancement layer. The video format information may be expressed by using a variable included in the sequence level of the base layer, for example, in the case of the VC-1 encoder, a 'COLORDIFF' variable may be used. Also, the video format information may be included as '0x09' in the second reserved area. That is, when the video format of an enhancement layer is not enhanced or when a variable of a base layer is utilized for an extended video format, the enhancement layer does not have to separately transmit enhanced video format information. In the example of the 'COLORDIFF' variable, '1' is used for defining a 4:2:0 video format, and '2' and '3' are specified as reserved areas. Accordingly, the variable can be used for defining a 4:2:2 video format and a 4:4:4 video format. Meanwhile, an additional hypothetical reference decoder (HRD) variable may be included as information on the enhancement layer. The HRD variable is a virtual video buffer variable which a decoder refers to for operating a buffer.

When a bit-depth or a video format does not change in units of GOPs, the start code of the header for the enhancement layer GOP level which is defined as '0x08' in the second reserved area is not necessary, and is designated as a reserved area. When the bit-depth or video format is changed in units of GOPs, the start code is necessary.

The start code for the header of the picture level, i.e., a frame level and a field level, of the enhancement layer which is defined as '0x07' and '0x06' in the second reserved area, includes additional information to indicate the bit-depth of an enhancement layer together with the bit-depth information of a base layer according to progressive or interlaced scanning. In an embodiment of the present invention, the start code includes a value of an additional quantization parameter corresponding to 'N−8' (where N is the bit-depth of the second encoder 117) when the bit-depth of the first encoder 113 is 8 bits. In this case, since an additional quantization parameter is used in units of pictures, the additional quantization parameter is included in the picture level. However, in other embodiments of the present invention, when an additional quantization parameter is used in units of slices, the additional quantization parameter is included in the slice level, when an additional quantization parameter is used in units of macroblocks, the additional quantization parameter is included in the macroblock level, and when an additional quantization parameter is used in units of blocks, the additional quantization parameter is included in the block level. In order to calculate an additional quantization parameter for each slice, macroblock or block, a process for calculating an additional quantization parameter of a picture level, which will be explained later, can be applied.

When the video format of the enhancement layer is not changed in comparison with the base layer, the start code for the header of the enhancement layer data which is defined as '0x05' in the second reserved area is not necessary, and therefore is designated as a reserved area. That is, when the video formats of the base layer and the enhancement layer are identically 4:2:0, data for 4 luminance blocks and 2 chrominance blocks forming one macroblock for a base layer is transmitted in the base layer, and data which is predicted using the 4 luminance blocks and 2 chrominance blocks forming one macroblock for the base layer is transmitted in the enhancement layer. Meanwhile, when the video formats of the base layer and the enhancement layer are different from each other, for example, when the video format of the base layer is 4:2:0 and the video format of the enhancement layer is 4:2:2 or when the video format of the base layer is 4:2:0 and the video format of the enhancement layer is 4:4:4, data for 4 luminance blocks and 2 chrominance blocks for the base layer are transmitted in the base layer, and in the enhancement layer, additional data on a chrominance component is transmitted together with the data predicted using the 4 luminance blocks and 2 chrominance blocks forming one macroblock for the base layer, so that the changed video format can be supported.

Meanwhile, information related to the enhancement layer is not restricted to the start codes described in table 1, and can be included in a reserved area which is reserved for future use in a sequence level, a GOP level, a picture level, a macroblock level or a block level. Also, an enhancement layer identifier can be included in a variety of ways in a variety of layers of a network protocol or a system layer for loading and packaging a video bitstream as a payload in order to transmit the bitstream.

Figure 2:
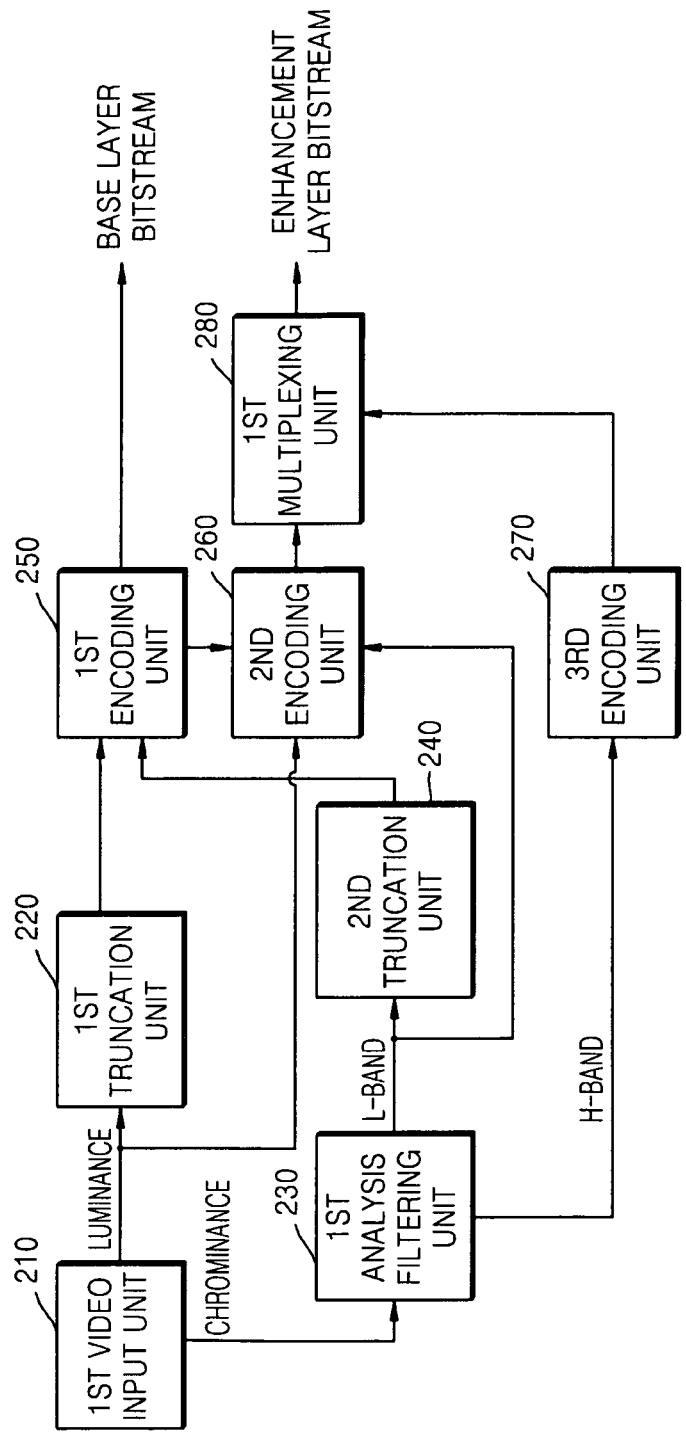
FIG. 2 illustrates a video encoding apparatus, according to an embodiment of the present invention.

FIG. 2 illustrates a video encoding apparatus, according to an embodiment of the present invention. The video encoding apparatus includes, for example, a first video input unit 210, a first truncation unit 220, a first analysis filtering unit 230, a second truncation unit 240, a first encoding unit 250, a second encoding unit 260, a third encoding unit 270, and a first multiplexing unit 280. Here, the first video input unit 210, the first truncation unit 220, the first analysis filtering unit 230, the second truncation unit 240, the first encoding unit 250, the second encoding unit 260, the third encoding unit 270, and the first multiplexing unit 280 can be implemented as at least one processor (not shown) by integrating them into at least one module, for example, as a base layer encoding module and enhancement layer encoding module. In order to enhance a first bit-depth to a second bit-depth and a first video format to a second video format, the video encoding apparatus according to the current embodiment divides a bitstream into at least two layers, and separately transmits the divided bitstreams so that a bitstream complying with the first bit-depth and the first video format is transmitted as a base layer and a bitstream formed with additional data required for enhancement to the second bit-depth and the second video format is transmitted as an enhancement layer. A decoding apparatus for the first bit-depth and the first video format generates a restoration image by decoding only the base layer, and a decoding apparatus for the second bit-depth and the second video format generates a restoration image by decoding both the base layer and the enhancement layer. Here, an example in which the first bit-depth is 8 bits, the second bit-depth is N bits (where N is equal to or greater than 10), the first video format is 4:2:0, and the second video format is 4:2:2 will now be explained.

Referring to FIG. 2, the first video input unit 210 receives an N-bit 4:2:2 image and divides the input image into a luminance component and a chrominance component.

In lower bits of the luminance component provided by the first video input unit 210, the first truncation unit 220 performs truncation of (N−8) bits, starting at the least significant bit. That is, by removing bits of less importance, the bit-depth is reduced from N bits to 8 bits.

The first analysis filtering unit 230 performs filtering of the chrominance component provided by the first video input unit 210, thereby separating the component into a low frequency band and a high frequency band. In this case, wavelet analysis filtering may be applied in the vertical direction. The separated low frequency band (L-band) chrominance component is provided to the second truncation unit 240, and the separated high frequency band (H-band) chrominance component is provided to the third encoding unit 270.

The second truncation unit 240 performs truncation of (N−8) bits starting at the least significant bit in lower bits of the low frequency band chrominance component provided by the first analysis filtering unit 230.

The first encoding unit 250 reconstructs a 4:2:0 image with the luminance component provided by the first truncation unit 220 and the low frequency band chrominance component provided by the second truncation unit 240. The first encoding unit 250 quantizes the reconstructed 4:2:0 image with a quantization parameter ($2^{N-8}QP_8$) of a base layer which is obtained by multiplying a base quantization parameter ($QP_8$) according to the 8-bit bit-depth by $2^{N-8}$, and with 8-bit 4:2:0 compression data obtained as a result, the first encoding unit 250 forms a base layer bitstream. The base layer bitstream includes the base quantization parameter ($QP_8$), and a base quantization level ($LEVEL_8$) which is a result of quantization of the luminance component and chrominance component forming a 4:2:0 image. Meanwhile, the base quantization parameter ($QP_8$) is provided to the third encoding unit 270.

The second encoding unit 260 generates an extended quantization level ($LEVEL_N$) by encoding the luminance component provided by the first video input unit 210 and the low frequency chrominance component provided by the first analysis filtering unit 230 with an extended quantization parameter ($QP_N$) according to the N-bit bit-depth. In this case, the extended quantization parameter ($QP_N$) is obtained as in Equation 2, described above. That is, if a base quantization parameter ($QP_8$) is provided by the first encoding unit 250 in relation to a refined quantization parameter (R) having a predetermined range, an extended quantization parameter ($QP_N$) and a refined quantization parameter (R) can be calculated according to Equation 2. In this case, in order to reduce the amount of data included in an enhancement layer bitstream, the second encoding unit 260 receives inputs of the base quantization level of the luminance component and the base quantization level of the low frequency band chrominance component from the first encoding unit, and refines the 8-bit bit-depth to an N-bit bit-depth. Then, the second encoding unit 260 obtains a first predicted quantization level, which is the difference between the base quantization level of the luminance component whose bit-depth is refined and the extended quantization level of the luminance component, which is quantized to the N-bit bit-depth, and obtains a second predicted quantization level, which is the difference between the base quantization level of the low frequency band chrominance component whose bit-depth is refined and the extended quantization level of the low frequency chrominance component, which is quantized to the N-bit bit-depth. By using the first predicted quantization level and the second predicted quantization level, the second encoding unit 260 generates N-bit 4:2:0 compression data.

The third encoding unit 270 generates high frequency band chrominance compression data, by encoding the high frequency band chrominance component provided by the first analysis filtering unit 230 with the extended quantization parameter ($QP_8$), according to the N-bit bit-depth. In relation to the high frequency band chrominance component, intra mode encoding may be performed.

The first multiplexing unit 280 forms N-bit 4:2:2 compression data, by multiplexing the N-bit 4:2:0 compression data provided by the second encoding unit 260 and the high frequency band chrominance compression data provided by the third encoding unit 270, and transmits the N-bit 4:2:2 compression data in an enhancement layer bitstream. The enhancement layer bitstream includes additional quantization information required for enhancement to the N-bit bit-depth, the luminance component forming a 4:2:0 image, the first and second predicted quantization level ($LEVEL_P$, $LEVEL_{P-C1}$), and the quantization level ($LEVEL_{N-C2}$) of the high frequency band chrominance component.

Here, in each encoding process, discrete cosine transformation (DCT) of the quantization level may be performed before the encoding process, or entropy encoding of the quantization level may be performed after the encoding process.

The base layer bitstream provided by the first encoding unit 250 and the enhancement layer bitstream provided by the first multiplexing unit 280 are combined, thereby forming a scalable bitstream (not shown). The scalable bitstream includes an enhancement layer identifier as described above.

Figure 3:
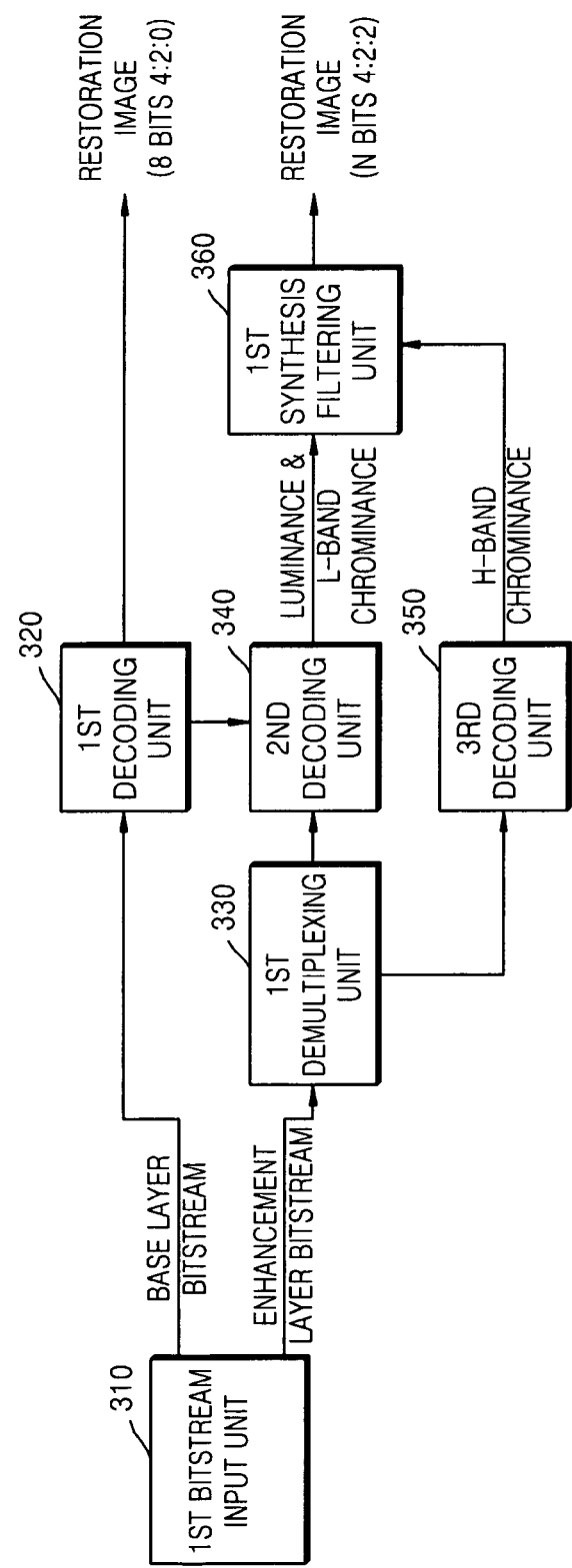
FIG. 3 illustrates a video decoding apparatus, according to an embodiment of the present invention.

FIG. 3 illustrates a video decoding apparatus, according to an embodiment of the present invention. The video decoding apparatus, according to the current embodiment, includes, for example, a first bitstream input unit 310, a first decoding unit 320, a first demultiplexing unit 330, a second decoding unit 340, a third decoding unit 350, and a first synthesis filtering unit 360. The video decoding apparatus has a structure corresponding to the structure of the video encoding apparatus illustrated in FIG. 2, but in reverse order. Here, the first bitstream input unit 310, the first decoding unit 320, the first demultiplexing unit 330, the second decoding unit 340, the third decoding unit 350, and the first synthesis filtering unit 360 can be implemented as at least one processor (not shown) by integrating them into at least one module, for example, as a base layer decoding module and enhancement layer decoding module. When a scalable bitstream, which is formed by a base layer bitstream complying with a first bit-depth and a first video format, and an enhancement layer bitstream formed with additional data required for enhancement to a second bit-depth and a second video format is received, the video decoding apparatus according to the current embodiment decodes both the base layer and the enhancement layer, thereby generating a restoration image of the first bit-depth and the first video format and/or a restoration image of the second bit-depth and the second video format. Meanwhile, when a non-scalable bitstream complying with the first bit-depth and the first video format, i.e., a base layer bitstream, is received, the video decoding apparatus according to the current embodiment decodes only the base layer and generates a restoration image.

Referring to FIG. 3, the first bitstream input unit 310 determines whether an input bitstream is a scalable bitstream or a non-scalable bitstream. If the input bitstream is a scalable bitstream, the first bitstream input unit 310 separates a base layer bitstream and an enhancement layer bitstream, and provides the base layer bitstream and the enhancement layer bitstream to the first decoding unit 320 and the first demultiplexing unit 330, respectively. If the input bitstream is a non-scalable bitstream, the first bitstream input unit 310 directly provides the bitstream to the first decoding unit 320. In this case, by using an enhancement layer identifier, it is determined whether the input bitstream is a scalable bitstream or a non-scalable bitstream. Meanwhile, the non-scalable bitstream refers to a bitstream which is encoded with a base quantization parameter.

The first decoding unit 320 receives an input of a base layer bitstream or a non-scalable bitstream, and inverse-quantizes a base quantization level ($LEVEL_8$) included in each bitstream with a base quantization parameter ($QP_8$), thereby generating an 8-bit 4:2:0 restoration image. In this case, although not shown, the base quantization parameter ($QP_8$) and the base quantization level ($LEVEL_8$) obtained in the first decoding unit 320 are provided to the second decoding unit 340 together with additional quantization information, for example, a refined quantization parameter (R). The base quantization parameter ($QP_8$) is provided to the third decoding unit 350 together with additional quantization information.

The first demultiplexing unit 330 receives an input of an enhancement layer bitstream, and demultiplexes N-bit 4:2:2 compression data included in the enhancement layer bitstream, thereby separating the data into N-bit 4:2:0 compression data and high frequency band chrominance compression data. The N-bit 4:2:0 compression data is provided to the second decoding unit 340, and the high frequency band chrominance compression data is provided to the third decoding unit 350.

The second decoding unit 340 receives inputs of the base quantization level of a luminance component and the base quantization level of a chrominance component provided by the first decoding unit 320, and refines the bit-depth from 8 bits to N bits. The second decoding unit 340 decodes N-bit 4:2:0 compression data provided by the first demultiplexing unit 330, and obtains a first predicted quantization level ($LEVEL_P$) of a luminance component quantized to an N-bit bit-depth, a second predicted quantization level ($LEVEL_{P-C1}$) of a low frequency band chrominance component, and a refined quantization parameter (R). The second decoding unit 340 adds the first predicted quantization level and the base quantization level of a luminance component whose bit-depth is refined, thereby obtaining an extended quantization level ($LEVEL_N$) of a luminance component, and adds the second predicted quantization level and the base quantization level of a low frequency band chrominance component whose bit-depth is refined, thereby obtaining an extended quantization level ($LEVEL_{N-C1}$) of a low frequency band chrominance component. The second decoding unit 340 inverse-quantizes the extended quantization level ($LEVEL_N$) of the luminance component and the extended quantization level ($LEVEL_{N-C1}$) of the low frequency band chrominance component with the extended quantization parameter ($QP_N$), and thereby restores a luminance component and a low frequency band chrominance component forming an N-bit 4:2:0 image. In this case, the extended quantization parameter ($QP_N$) can be calculated as in Equation 2, which is described above, by using the base quantization level ($QP_8$) and the refined quantization parameter (R).

The third decoding unit 350 decodes the high frequency band chrominance compression data provided by the first demultiplexing unit 330, thereby obtaining a quantization level ($LEVEL_{N-C2}$) of a high frequency band chrominance component. The third decoding unit 350 reverse-quantizes the quantization level ($LEVEL_{N-C2}$) of the high frequency band chrominance component with the extended quantization parameter ($QP_N$), thereby restoring a high frequency band chrominance component.

The first synthesis filtering unit 360 receives inputs of the luminance component and the low frequency band chrominance component, which form an N-bit 4:2:0 image, from the second decoding unit 340, and an input of the high frequency band chrominance component from the third decoding unit 350. By performing filtering of the low frequency band chrominance component and the high frequency band chrominance component, the first synthesis filtering unit 360 forms a chrominance component of a 4:2:2 video format, and by using the chrominance component together with the luminance component, generates an N-bit 4:2:2 restoration image. In this case, wavelet synthesis filtering can be applied in the vertical direction corresponding to the first analysis filtering unit 230.

In this case, in each decoding process inverse DCT of the quantization level may be performed before the decoding process, or entropy decoding of the quantization level may be performed after the decoding process.

Figure 4:
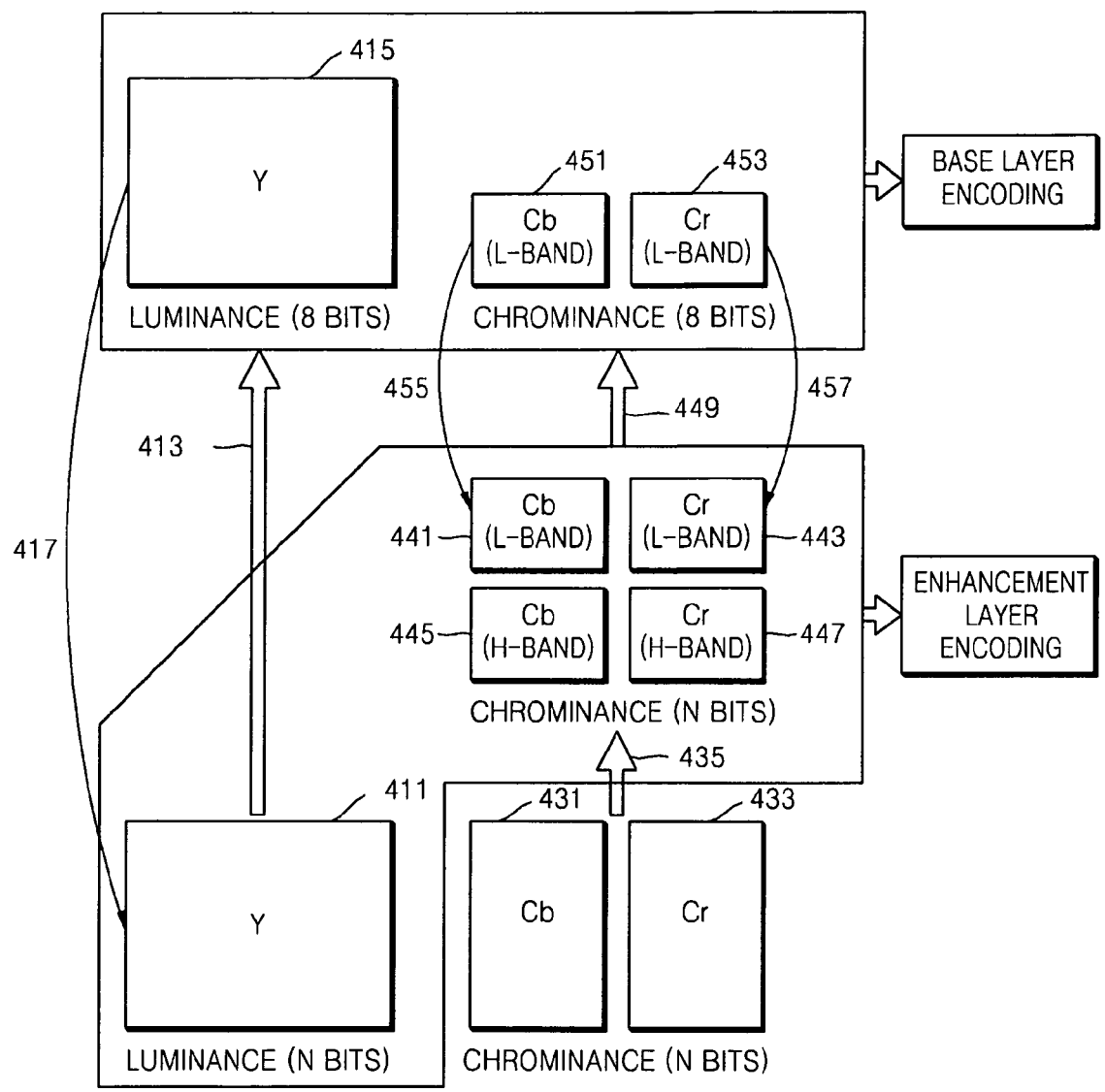
FIG. 4 explains an 8-bit 4:2:0 image, which is encoded in a base layer, and an N-bit 4:2:2 image, which is encoded in an enhancement layer in the video encoding apparatus illustrated in FIG. 2, according to an embodiment of the present invention.

FIG. 4 explains an 8-bit 4:2:0 image, which is encoded in a base layer, and an N-bit 4:2:2 image which is encoded in an enhancement layer in the video encoding apparatus illustrated in FIG. 2, according to an embodiment of the present invention.

Referring to FIG. 4, a truncation process 413 for a luminance component 411 of an N-bit 4:2:2 image is performed, thereby forming a luminance component 415 whose bit-depth is refined to an 8-bit bit-depth. In order to obtain a prediction value of the luminance component 411 in the future, the luminance component 415 is provided in operation 417. By performing operation 435 for vertical analysis filtering of chrominance components 431 and 433 of the N-bit 4:2:2 image, the chrominance components 431 and 433 are separated into low frequency band chrominance components 441 and 443 and high frequency band chrominance components 445 and 447. By performing operation 449 for truncation of the low frequency band chrominance components 441 and 443, low frequency band chrominance components 451 and 453 refined to a bit-depth of 8 bits are formed. In order to obtain prediction values of the low frequency band chrominance components 441 and 443 in the future, the low frequency band chrominance components 451 and 453 are provided in operations 455 and 457. The luminance component 415 and the chrominance components 451 and 453 form an 8-bit 4:2:0 image and are encoded in order to generate a bitstream, which is transmitted as a base layer. Prediction values of the luminance component 411 and the chrominance components 441 and 443 form an N-bit 4:2:0 image, and are encoded in order to generate a bitstream, which is transmitted as an enhancement layer together with the chrominance components 445 and 447.

Figure 5:
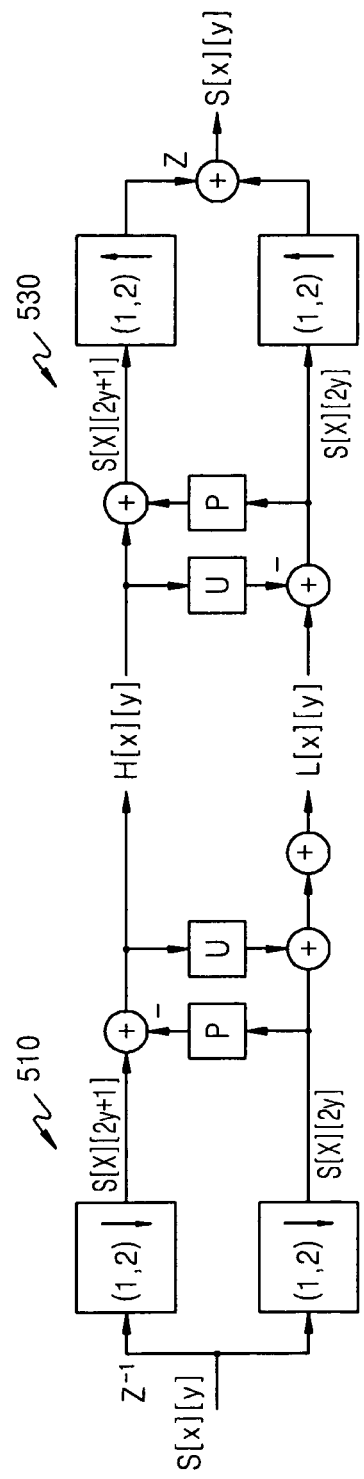
FIG. 5 explains application of an analysis filter and a synthesis filter using a lifting structure, according to an embodiment of the present invention.

FIG. 5 explains application of the first analysis filtering unit 230 and the first synthesis filtering unit 360 using a lifting structure in an encoding process and decoding process, according to an embodiment of the present invention. First, by applying the first analysis filtering unit 230 to an encoding process, an image is divided into a low frequency band value formed by a low frequency component and a high frequency band value formed by a high frequency component. More specifically, a prediction value is obtained from a pixel value at an even-numbered location, and the differential value between the prediction value and a pixel value at an odd-numbered location, thereby forming a high frequency band value. This high frequency band value is set as an update value, and the update value is added again to a pixel value at an even-numbered location, thereby forming a low frequency band value. An output of the first analysis filtering unit 230 using the lifting structure, that is, the high frequency band value (H[x][y]) and the low frequency band value (L[x][y]) of a pixel at coordinates (x,y), can be expressed as given by Equation 3 below.

$$H[x][y]=s[x][2y+1]-P(s[x][2y])$$

$$L[x][y]=s[x][2y]+U(H[x][y]) \quad \text{Equation 3}$$

Here, a prediction value (P(.)) and an update value (U(.)) for applying the lifting structure can be expressed as given by Equation 4 below.

$$P(s[x][2y]) = \sum_i p_i \cdot s[x][2(y+i)] \quad \text{Equation 4}$$

$$U(H[x][y]) = \sum_i u_i \cdot H[x][y+i]$$

Meanwhile, when a Haar filter or a 5/3 tap wavelet filter is applied, a prediction value (P(.)) and an update value (U(.))

can be respectively expressed as given by Equations 5 and 6 below.

$$P_{Haar}(s[2y][x]) = s[x][2y]$$
$$U_{Harr}(H[x][y]) = \frac{1}{2}H[x][y]$$

Equation 5

$$P_{5/3}(s[2y][x]) = \frac{1}{2}(s[x][2y]) - s[x][2y+2])$$
$$U_{5/3}(H[x][y]) = \frac{1}{4}(H[x][y]) + H[x][y-1])$$

Equation 6

Meanwhile, by applying the first synthesis filtering unit 360 to a decoding process, a pixel value is restored by synthesizing a low frequency band value and a high frequency band through a process that is reverse of that performed in the first analysis filtering unit 360. More specifically, a high frequency band value is set as an update value, and the update value is subtracted from a low frequency band value, thereby obtaining a pixel value at an even-numbered location. A prediction value is obtained from the pixel value at an even-numbered location and the prediction value is added to a high frequency band value, thereby obtaining a pixel value at an odd-numbered location. An output of the first synthesis filtering unit 360 using the lifting structure, that is, the pixel value s[x][2y] at an even-numbered location which is (x,2y) and the pixel value s[x][2y+1] at an odd-numbered location which is (x,2y+1) can be expressed as given by Equation 7 below.

$$s[x][2y]=L[x][y]-U(H[x][y])$$

$$s[x][2y+1]=H[x][y]+P(s[x][2y])$$

Equation 7

If the first analysis filtering unit 230 and the first synthesis filtering unit 360 of the lifting structure are employed, it is advantageous in that lossless restoration is enabled. Accordingly, video encoding and decoding according to the present invention enables restoration of a high quality image, by restoring both a base layer and an enhancement layer.

Figure 6:
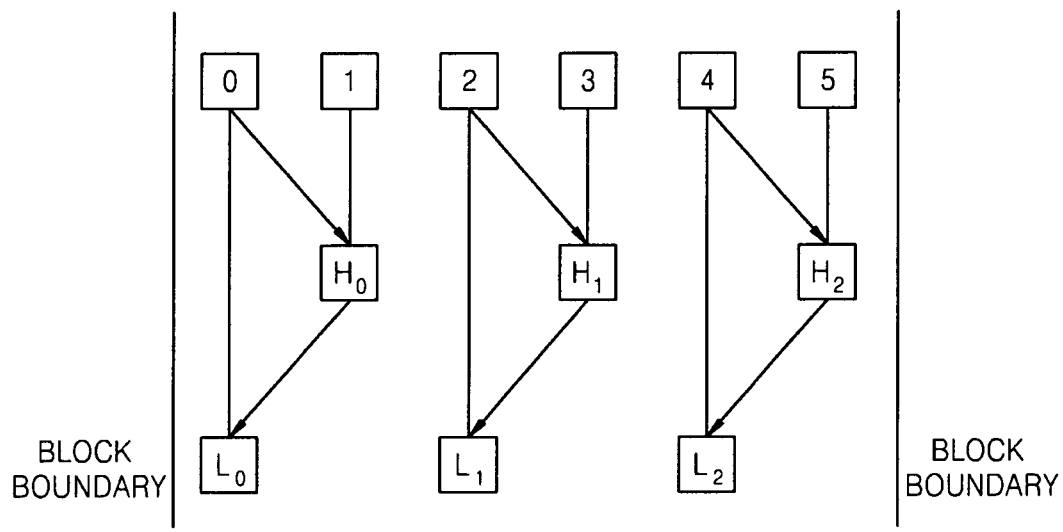
FIG. 6 illustrates an example in which a Haar filter having a lifting structure is applied to a one-dimensional pixel array, according to an embodiment of the present invention.
Figure 7:
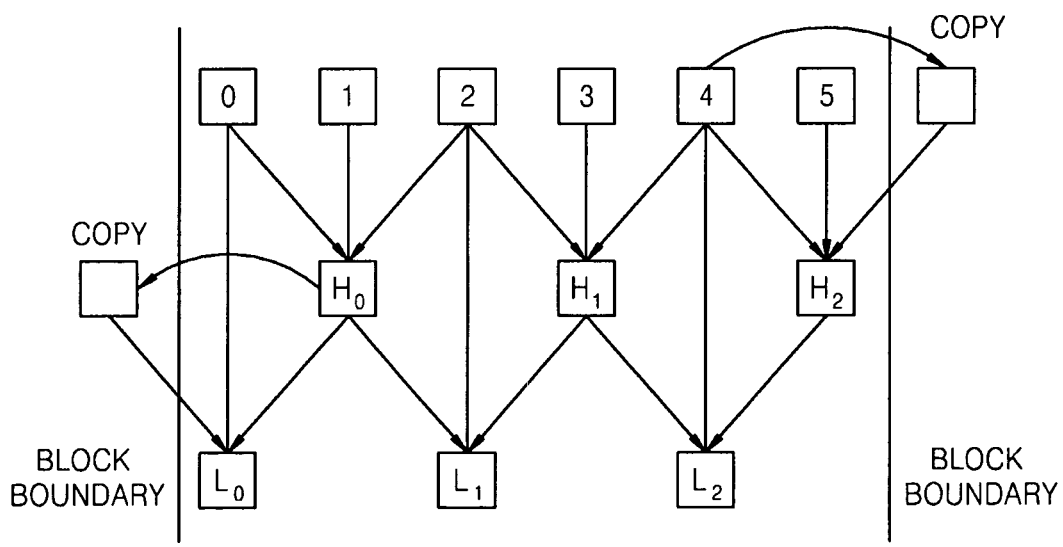
FIG. 7 illustrates an example in which a 5/3 tap wavelet filter having a lifting structure is applied to a one-dimensional pixel array, according to an embodiment of the present invention.

FIG. 6 illustrates an example in which a Haar filter having a lifting structure is applied to a one-dimensional pixel array, according to an embodiment of the present invention, and shows an application process of Equations 3, 4, and 5. FIG. 7 is a diagram illustrating an example in which a 5/3 tap wavelet filter having a lifting structure is applied to a one-dimensional pixel array, according to an embodiment of the present invention, and shows an application process of Equations 3, 4, and 6. According to this, 3 neighboring pixels are applied to the one-dimensional pixel array for a high frequency band, and 5 neighboring pixels are applied to the one-dimensional pixel array for a low frequency band.

Figure 8A:
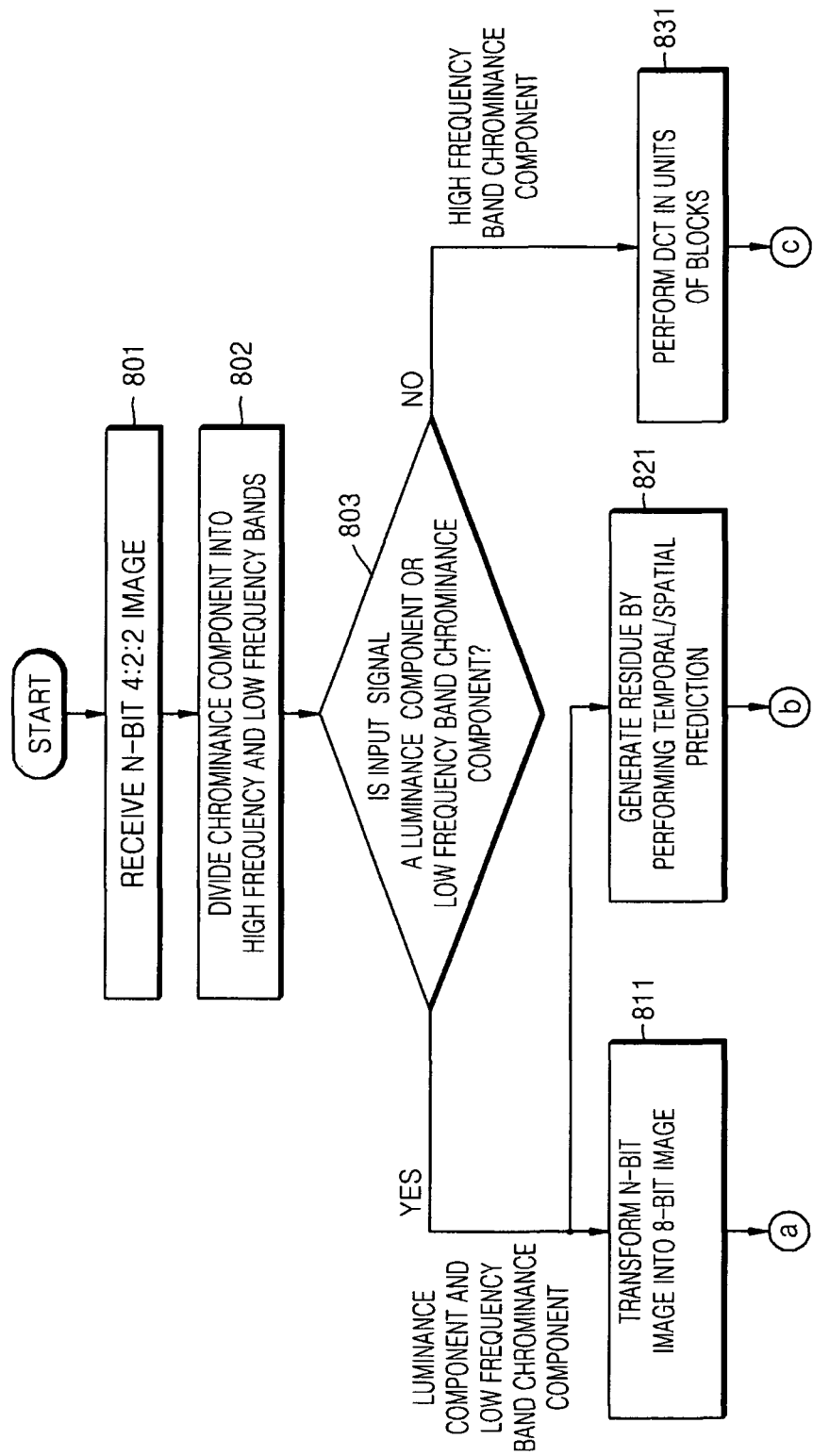
FIG. 8 explains an operation of a video encoding method, according to an embodiment of the present invention.
Figure 8B:
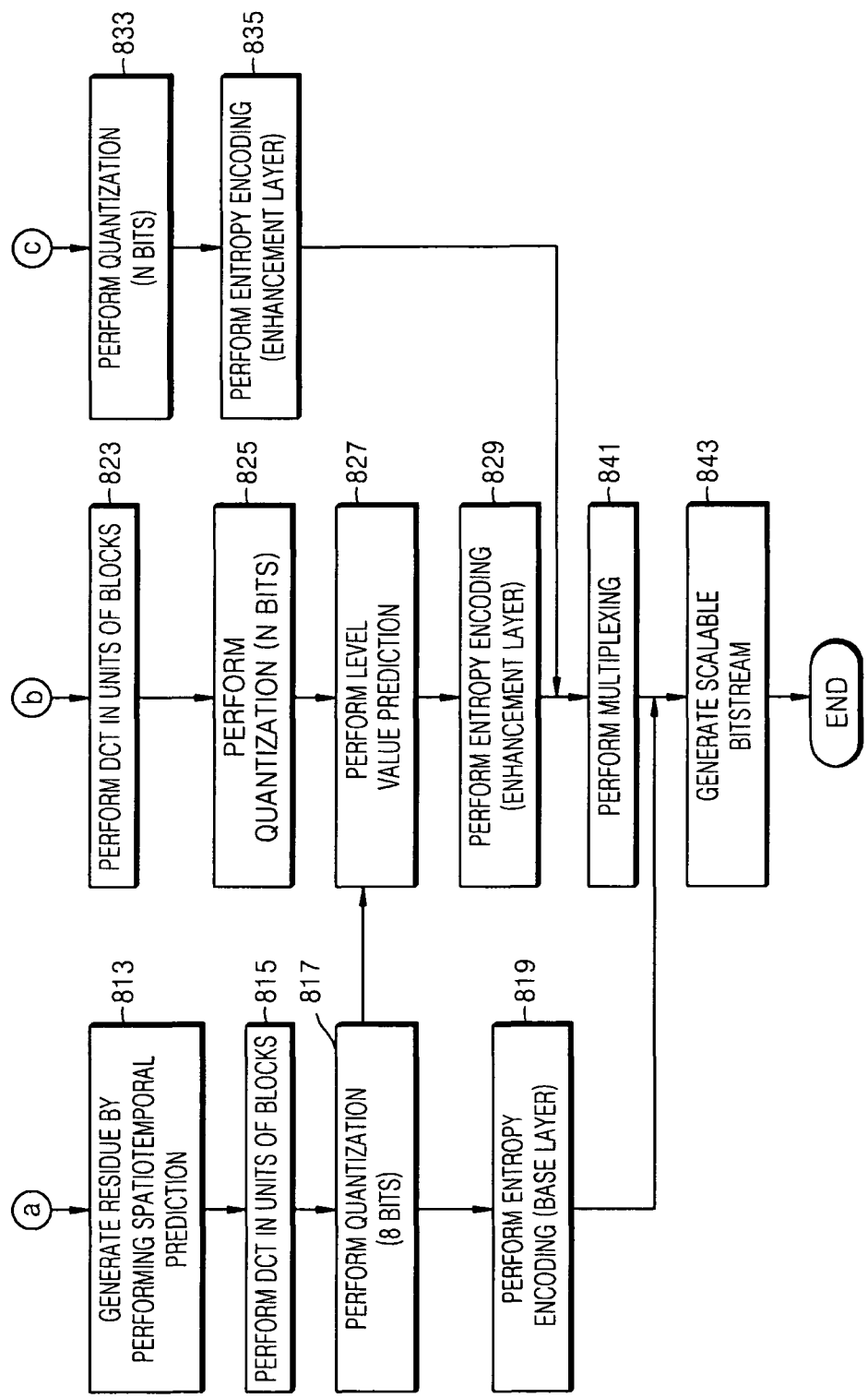

FIG. 8 explains an operation of a video encoding method, according to an embodiment of the present invention.

Referring to FIG. 8, an N-bit 4:2:2 image is received in operation 801.

In operation 802, the chrominance component of the N-bit 4:2:2 image is divided into a low frequency band and a high frequency band. In this case, wavelet analysis filtering of the chrominance component may be performed in the vertical direction, thereby dividing the frequency bands.

In operation 803, it is determined whether an input signal is a luminance component or a low frequency band chrominance component. According to the result of the determination in operation 803, dualistic encoding of the luminance component and the low frequency band chrominance component is performed, thereby generating compression data to be included in a base layer and compression data to be included in an enhancement layer. Meanwhile, according to the result of the determination in operation 803, encoding of the high frequency band chrominance component is separately performed, thereby generating compression data included in an enhancement layer. This will now be explained in more detail.

In operations 811 through 819, 8-bit 4:2:0 encoding of the luminance component and the low frequency band chrominance is performed, thereby generating encoded data for a base layer. In operation 811, the N-bit image is transformed into an 8-bit image. In this case, truncation of (N−8) bits from the least significant bit in lower bits of the N-bit image is performed. In operation 813, spatio-temporal prediction of the 8-bit image is performed, thereby generating a residue image. In operation 815, DCT of the residue image is performed in units of blocks. In operation 817, quantization of DCT coefficients is performed with a quantization parameter obtained by multiplying a base quantization parameter corresponding to a bit-depth of 8 bits, by $2^{N-8}$. In operation 819, entropy encoding of a base quantization level obtained as a result of the quantization is performed, and compression data obtained as a result of the entropy encoding and the base quantization parameter form a base layer bitstream.

In operations 821 through 829, N-bit 4:2:0 encoding of the luminance component and the low frequency band chrominance component is performed, thereby generating compression data for an enhancement layer. In operation 821, spatio-temporal prediction of the N-bit image is performed, thereby generating a residue image. In operation 823, DCT of the residue image is performed in units of blocks. In operation 825, quantization of DCT coefficients is performed with an extended quantization parameter corresponding to a bit-depth of N bits. In operation 827, the bit-depth of a base quantization level obtained as a result of the quantization in operation 817 is refined, and then, the difference between extended quantization levels obtained as a result of the quantization in operation 825, that is, a predicted quantization level, is obtained. In operation 829, entropy encoding of the predicted quantization level is performed, and compression data obtained as a result of the entropy encoding and a refined quantization parameter for obtaining an extended quantization parameter are provided in order to form an enhancement layer bitstream.

In operations 831 through 835, N-bit 4:2:2 encoding of the high frequency band chrominance component is performed, thereby generating compression data for an enhancement layer. In operation 831, DCT of the high frequency band chrominance component is performed in units of blocks. In operation 833, quantization of DCT coefficients is performed with an extended quantization parameter corresponding to a bit-depth of N bits. In operation 835, entropy encoding of the extended quantization level obtained as a result of the quantization is performed, and compression data obtained as a result is provided in order to form an enhancement layer bitstream.

In operation 841, by multiplexing the compression data corresponding to the N-bit 4:2:0 image obtained in operation 829 and the compression data for the high frequency band chrominance component obtained in operation 835, compression data corresponding to an N-bit 4:2:2 image is obtained, thereby forming an enhancement layer bitstream.

In operation 843, by combining the base layer bitstream formed in operation 819 and the enhancement layer bitstream formed in operation 841, a scalable bitstream is generated.

Figure 9:
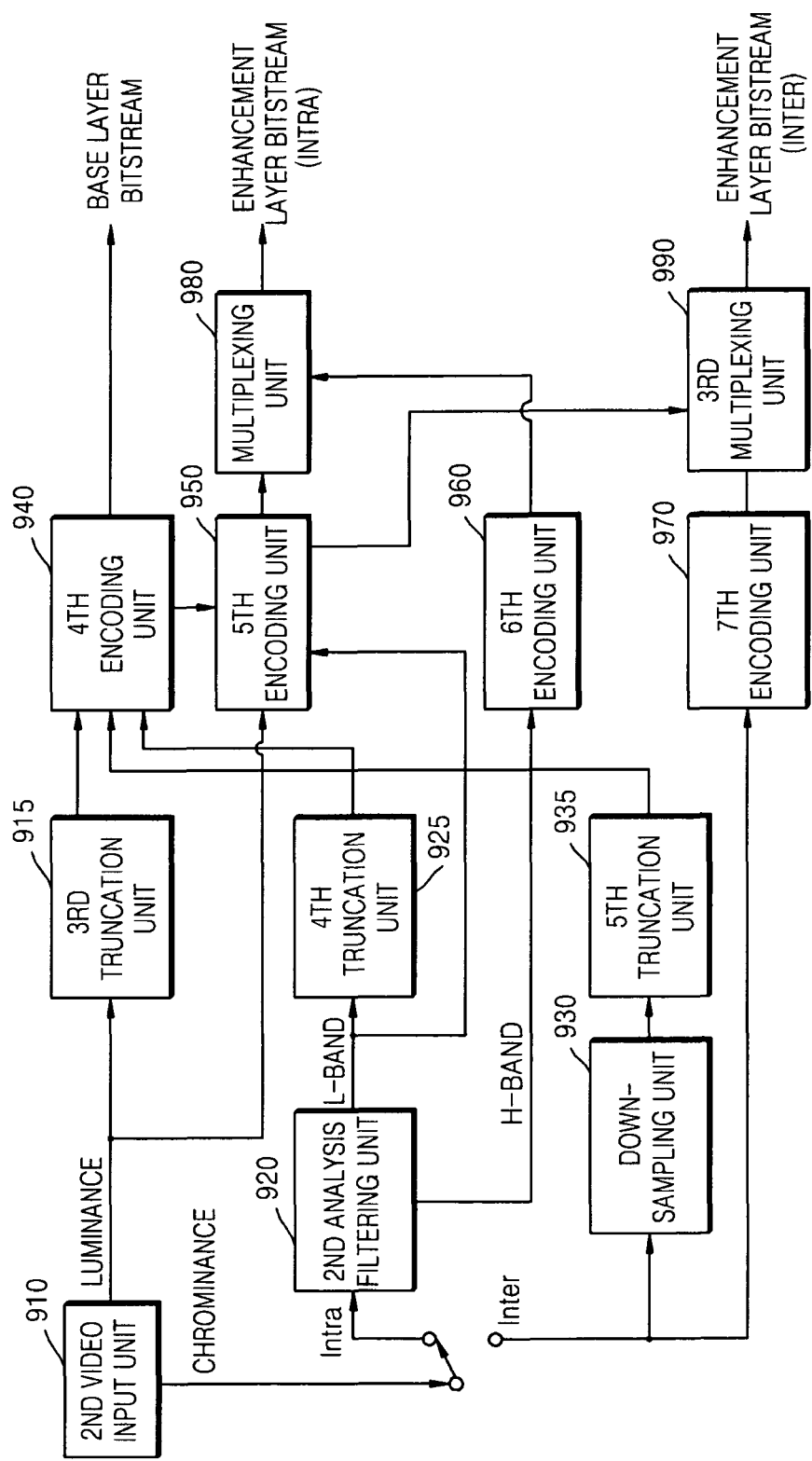
FIG. 9 illustrates a video encoding apparatus, according to another embodiment of the present invention.

FIG. 9 illustrates a video encoding apparatus, according to another embodiment of the present invention. The video encoding apparatus according to the current embodiment includes, for example, a second video input unit 910, a third truncation unit 915, a second analysis filtering unit 920, a fourth truncation unit 925, a down-sampling unit 930, a fifth truncation unit 935, a fourth encoding unit 940, a fifth encoding unit 950, a sixth encoding unit 960, a seventh encoding unit 970, a second multiplexing unit 980, and a third multiplexing unit 990. Here, the second video input unit 910, the third truncation unit 915, the second analysis filtering unit 920, the fourth truncation unit 925, the down-sampling unit 930, the fifth truncation unit 935, the fourth encoding unit 940, the fifth encoding unit 950, the sixth encoding unit 960, the seventh encoding unit 970, the second multiplexing unit 980, and the third multiplexing unit 990 can be implemented as at least one processor (not shown) by integrating them into as at least one module. In order to enhance a first bit-depth to a second bit-depth and a first video format to a second video format, the video encoding apparatus according to the current embodiment divides a bitstream into at least two layers, and separately transmits the divided bitstreams so that a bitstream complying with the first bit-depth and the first video format is transmitted as a base layer and a bitstream formed with additional data required for enhancement to the second bit-depth and the second video format is transmitted as an enhancement layer. A decoding apparatus for the first bit-depth and the first video format generates a restoration image by decoding only the base layer, and a decoding apparatus for the second bit-depth and the second video format generates a restoration image by decoding both the base layer and the enhancement layer. Here, an example in which the first bit-depth is 8 bits, the second bit-depth is N bits (where N is equal to or greater than 10), the first video format is 4:2:0, and the second video format is 4:2:2 will now be explained. In an intra mode, the video encoding apparatus illustrated in FIG. 9 is the same as the video encoding apparatus illustrated in FIG. 2. Meanwhile, in an inter mode, wavelet analysis filtering is not performed, and instead down-sampling is performed in the vertical direction. In addition, according to a first embodiment, encoding in an enhancement layer is performed by referring to the result of motion estimation and motion compensation performed in a base layer. According to a second embodiment, by sharing a motion vector obtained as a result of motion estimation in the base layer, motion compensation is separately performed in the base layer and in the enhancement layer. According to a third embodiment, by sharing a motion vector obtained as a result of motion estimation in the enhancement layer, motion compensation is separately performed in the base layer and in the enhancement layer. According to a fourth embodiment, motion estimation and motion compensation are separately performed in the base layer and in the enhancement layer.

Referring to FIG. 9, the second video input unit 910 receives an input of an N-bit 4:2:2 image, and divides the image into a luminance component and a chrominance component. According to whether an encoding mode is an intra mode or inter mode, the second video input unit 910 provides the chrominance component to the second analysis filtering unit 920 or the down-sampling unit 930.

In lower bits of the luminance component provided by the second video input unit 910, the third truncation unit 915 performs truncation of (N−8) bits, starting at the least significant bit.

If the encoding mode is an intra mode, the second analysis filtering unit 920 performs filtering of the chrominance component provided by the second video input unit 910, thereby separating the chrominance component into a low frequency band and a high frequency band. In this case, wavelet analysis filtering may be applied in the vertical direction. The separated low frequency band (L-band) chrominance component is provided to the fourth truncation unit 925, and the separated high frequency band (H-band) chrominance component is provided to the sixth encoding unit 960.

The fourth truncation unit 925 performs truncation of (N−8) bits from the least significant bit in lower bits of the low frequency band chrominance component provided by the second analysis filtering unit 920.

If the encoding mode is an inter mode, the down-sampling unit 930 performs down-sampling by a factor of 2 of the chrominance component provided by the second video input unit 910 in the vertical direction.

The fifth truncation unit 935 performs truncation of (N−8) bits from the least significant bit in lower bits of the chrominance component provided by the down-sampling unit 930.

If the encoding mode is an intra mode, the fourth encoding unit 940 reconstructs a 4:2:0 image with the luminance component provided by the third truncation unit 915 and the low frequency band chrominance component provided by the fourth truncation unit 925, and quantizes the reconstructed 4:2:0 image with a quantization parameter obtained by multiplying a base quantization parameter ($QP_8$) according to a bit-depth of 8 bits by $2^{N-8}$. With an 8-bit 4:2:0 compression data obtained as a result of the quantization, the fourth encoding unit 940 forms a base layer bitstream. Meanwhile, if the encoding mode is an inter mode, the fourth encoding unit 940 reconstructs a 4:2:0 image with the luminance component provided by the third truncation unit 915 and the low frequency band chrominance component provided by the fifth truncation unit 935, and quantizes the reconstructed 4:2:0 image with a quantization parameter obtained by multiplying a base quantization parameter ($QP_8$) according to a bit-depth of 8 bits by $2^{N-8}$. With an 8-bit 4:2:0 compression data obtained as a result of the quantization, the fourth encoding unit 940 forms a base layer bitstream. In the base layer bitstream, the base quantization parameter ($QP_8$), and a base quantization level ($LEVEL_8$), which is the result of quantization of the luminance component and the chrominance component forming the 4:2:0 image, are included together with a motion vector. In this case, the base quantization parameter ($QP_8$) and the base quantization level ($LEVEL_8$) are provided to the fifth encoding unit 950. Meanwhile, the base quantization parameter ($QP_8$) is provided to the sixth encoding unit 960 and the seventh encoding unit 970.

If the encoding mode is an intra mode, the fifth encoding unit 950 encodes the luminance component provided by the second video input unit 910 and the low frequency band chrominance component provided by the second analysis filtering unit 920 with an extended quantization parameter ($QP_N$) according to a bit-depth of N bits, thereby generating an extended quantization level ($LEVEL_N$). The extended quantization parameter ($QP_N$) is obtained as in Equation 2 which is described above. If a base quantization parameter ($QP_8$) is provided by the fourth encoding unit 940 in relation to a refined quantization parameter (R) having a predetermined range, an extended quantization parameter ($QP_N$) and a refined quantization parameter (R) can be calculated according to Equation 2. In this case, in order to reduce the amount of data included in an enhancement layer bitstream, the fifth encoding unit 950 performs the same operation as that performed by the second encoding unit 260 illustrated in FIG. 2. By using a third predicted quantization level for a luminance component and a fourth predicted quantization level for a low frequency band chrominance component obtained as a result of the operation, the fifth encoding unit 950 generates N-bit 4:2:0 compression data. Meanwhile, if the encoding mode is an inter mode, a third predicted quantization level for a luminance component obtained in the fifth encoding unit 950 is provided to the third multiplexing unit 990.

If the encoding mode is an intra mode, the sixth encoding unit 960 encodes the high frequency band chrominance component provided by the second analysis filtering unit 920 with a bit-depth of N bits, and generates chrominance compression data in a high frequency band. For the high frequency band chrominance component, intra mode encoding may be performed.

If the encoding mode is an inter mode, the seventh encoding unit 970 encodes the chrominance component provided by the second video input unit 910 with an extended quantization parameter ($QP_N$) according to a bit-depth of N bits, thereby generating an extended quantization level ($LEVEL_N$).

If the encoding mode is an intra mode, the second multiplexing unit 980 multiplexes the N-bit 4:2:0 compression data provided by the fifth encoding unit 950 and the high frequency band chrominance compression data provided by the sixth encoding unit 960, thereby forming N-bit 4:2:2 compression data and transmitting the N-bit 4:2:2 compression data as an enhancement layer bitstream. In the enhancement layer bitstream, additional quantization information required for enhancement to a bit-depth of N bits, the first and second quantization level ($LEVEL_P$, $LEVEL_{P-C1}$) for the luminance component and the low frequency band chrominance component forming a 4:2:0 image, and the quantization level ($LEVEL_{N-C2}$) of the high frequency band chrominance component are included.

If the encoding mode is an inter mode, the third multiplexing unit 990 multiplexes the compression data of the luminance component provided by the fifth encoding unit 950 and the compression data of the chrominance component provided by the seventh encoding unit 970, thereby forming N-bit 4:2:2 compression data and transmitting the N-bit 4:2:2 compression data as an enhancement layer bitstream. In this case, in the enhancement layer bitstream, a motion vector shared by the base layer may be included or a motion vector not shared by the base layer may be included.

Here, in each encoding process, DCT of the quantization level may be performed before the encoding process or entropy encoding of the quantization level may be performed after the encoding process. Meanwhile, information on whether the encoding mode is an inter mode or an intra mode may be included in a header of a picture level or macroblock level of a base layer or an enhancement layer.

Although not shown, the base layer bitstream provided by the fourth encoding unit 940 and the enhancement layer bitstream provided by the second multiplexing unit 980 or the third multiplexing unit 990 are combined, thereby forming a scalable bitstream. The scalable bitstream includes an enhancement layer identifier as described above.

Figure 10:
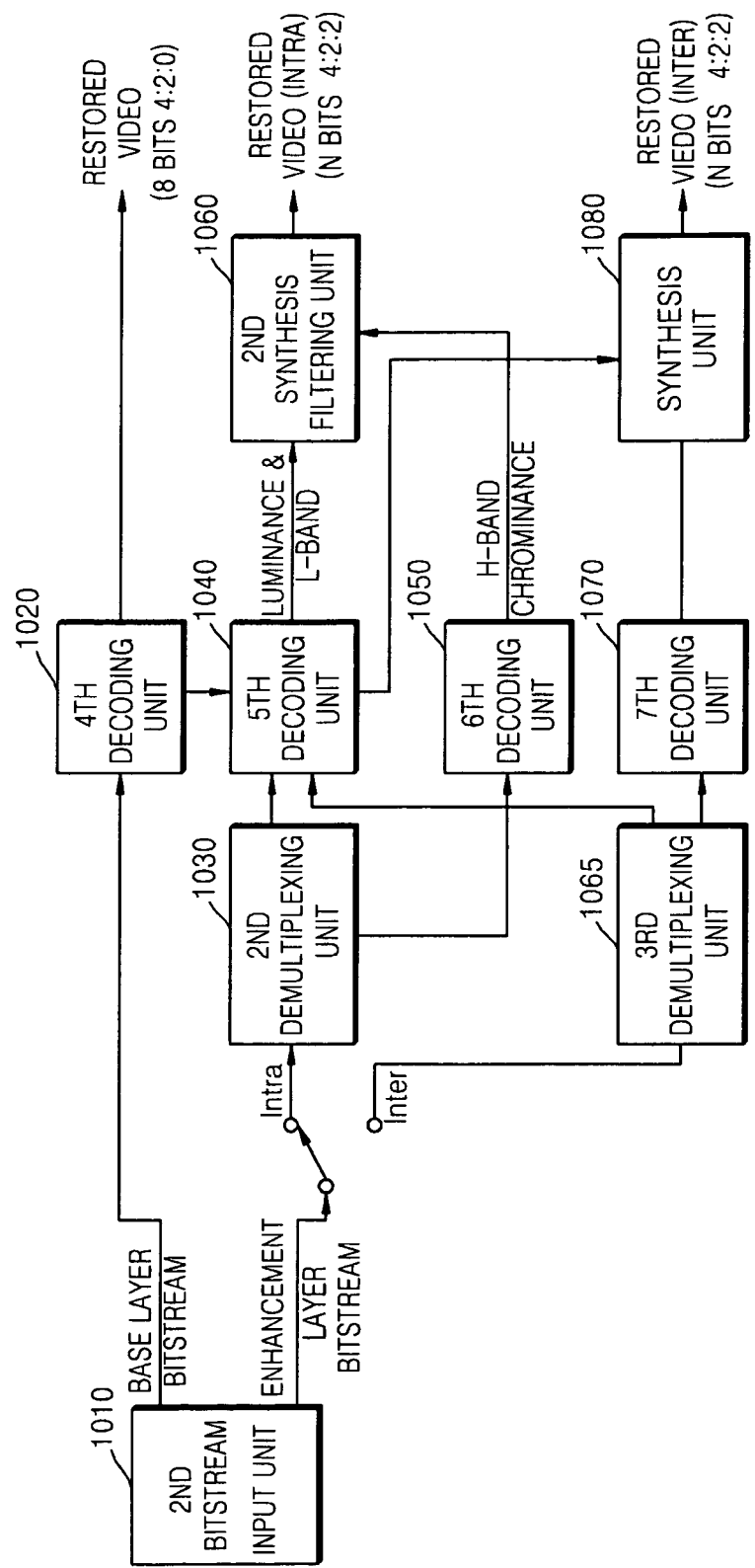
FIG. 10 illustrates a structure of a video decoding apparatus, according to another embodiment of the present invention.

FIG. 10 illustrates a structure of a video decoding apparatus, according to another embodiment of the present invention. The video decoding apparatus according to the current embodiment includes, for example, a second bitstream input unit 1010, a fourth decoding unit 1020, a second demultiplexing unit 1030, a fifth decoding unit 1040, a sixth decoding unit 1050, a second synthesis filtering unit 1060, a third demultiplexing unit 1065, a seventh decoding unit 1070, and a synthesis unit 1080, and has a structure corresponding to the structure of the video encoding apparatus illustrated in FIG. 9, but in reverse order. Here, the second bitstream input unit 1010, the fourth decoding unit 1020, the second demultiplexing unit 1030, the fifth decoding unit 1040, the sixth decoding unit 1050, the second synthesis filtering unit 1060, the third demultiplexing unit 1065, the seventh decoding unit 1070, and the synthesis unit 1080, can be implemented as at least one processor (not shown) by integrating them into at least one module. When a scalable bitstream, which is formed by a base layer bitstream complying with a first bit-depth and a first video format, and an enhancement layer bitstream formed with additional data required for enhancement to a second bit-depth and a second video format is received, the video decoding apparatus according to the current embodiment decodes both the base layer and the enhancement layer, thereby generating a restoration image of the first bit-depth and the first video format and/or a restoration image of the second bit-depth and the second video format. Meanwhile, when a non-scalable bitstream complying with the first bit-depth and the first video format, i.e., a base layer bitstream, is received, the video decoding apparatus according to the current embodiment decodes only the base layer and generates a restoration image.

Referring to FIG. 10, the second bitstream input unit 1010 determines whether an input bitstream is a scalable bitstream or a non-scalable bitstream, and at the same time determines whether the encoding mode is an intra mode or an inter mode if the input bitstream is a scalable bitstream. If the input bitstream is a scalable bitstream and the encoding mode is an intra mode, a base layer bitstream and an enhancement layer bitstream are separated, and provided to the fourth decoding unit 1020 and the second demultiplexing unit 1030, respectively. If the input bitstream is a scalable bitstream and the encoding mode is an inter mode, a base layer bitstream and an enhancement layer bitstream are separated and provided to the fourth decoding unit 1020 and the third demultiplexing unit 1065, respectively. Meanwhile, if the input bitstream is a non-scalable bitstream, the bitstream is directly provided to the fourth decoding unit 1020. In this case, by using an enhancement layer identifier, it is determined whether the bitstream is a scalable or non-scalable bitstream. Meanwhile, the non-scalable bitstream refers to a bitstream encoded with a base quantization parameter.

The fourth decoding unit 1020 receives an input of a base layer bitstream or a non-scalable bitstream, and inverse-quantizes a base quantization level ($LEVEL_8$), included in each bitstream, with a base quantization parameter ($QP_8$), thereby generating an 8-bit 4:2:0 restoration image. More specifically, if the encoding mode is an intra mode, the fourth decoding unit 1020 decodes a base quantization level of a luminance component and a base quantization level of a low frequency band chrominance component included in the base layer bitstream. If the encoding mode is an inter mode, the fourth decoding unit 1020 decodes a base quantization level of a luminance component included in the base layer bitstream and a base quantization level of a down-sampled chrominance component.

The base quantization parameter ($QP_8$) and the base quantization level ($LEVEL_8$) obtained here are provided to the fifth decoding unit 1040, together with additional quantization information. The base quantization parameter ($QP_8$) is provided to the sixth decoding unit 1050 and the seventh decoding unit 1070 together with additional quantization information.

If the encoding mode is an intra mode, the second demultiplexing unit 1030 receives an input of the enhancement layer bitstream provided by the second bitstream input unit 1010, and demultiplexes N-bit 4:2:2 compression data included in the enhancement layer bitstream, thereby separating N-bit 4:2:0 compression data and chrominance compression data of a high frequency band. The N-bit 4:2:0 compression data is provided to the fifth decoding unit 1040 and the high frequency band chrominance compression data is provided to the sixth decoding unit 1050.

If the encoding mode is an intra mode, the fifth decoding unit 1040 receives inputs of the base quantization level of the luminance component and the base quantization level of the low frequency band chrominance component provided by the fourth decoding unit 1020, and refines the bit-depth from 8 bits to N bits.

The fifth decoding unit 1040 performs the same operation as that of the second decoding unit 340 illustrated in FIG. 2. As a result, the fifth decoding unit 1040 reverse-quantizes the extended quantization level ($LEVEL_N$) of the luminance component and the extended quantization level ($LEVEL_{N-C1}$) of the low frequency band chrominance component with an extended quantization parameter ($QP_N$), and restores a luminance component and a low frequency band chrominance component forming an N-bit 4:2:0 image.

Meanwhile, if the encoding mode is an inter mode, the fifth decoding unit 1040 receives an input of the base quantization level of the luminance component provided by the fourth decoding unit 1020, and refines the bit-depth from 8 bits to N bits. The fifth decoding unit 1040 performs the same operation as that of the second decoding unit 340, illustrated in FIG. 2. As a result, the fifth decoding unit 1040 reverse-quantizes the extended quantization level ($LEVEL_N$) of the luminance component with the extended quantization parameter ($QP_N$), and restores a luminance component forming an N-bit 4:2:0 image.

The sixth decoding unit 1050 decodes the chrominance compression data of a high frequency band provided by the second demultiplexing unit 1030, and obtains a quantization level ($LEVEL_{N-C2}$) of a high frequency band chrominance component. The sixth decoding unit 1050 reverse-quantizes the quantization level ($LEVEL_{N-C2}$) of the high frequency band chrominance component with the extended quantization parameter ($QP_N$), and restores a high frequency band chrominance component.

The second synthesis filtering unit 1060 receives inputs of a luminance component and a low frequency band chrominance component forming an N-bit 4:2:0 image from the fifth decoding unit 1040, and receives an input of a high frequency band chrominance component from the sixth decoding unit 1050. By performing synthesis filtering of the low frequency band chrominance component and the high frequency band chrominance component, the sixth decoding unit 1050 forms a chrominance component of a 4:2:2 video format, and by using the chrominance component with the luminance component, the sixth decoding unit 1050 generates an N-bit 4:2:2 restoration image for an intra mode.

If the encoding mode is an inter mode, the third demultiplexing unit 1065 receives an enhancement layer bitstream provided by the second bitstream input unit 1010, and by demultiplexing N-bit 4:2:2 compression data included in the enhancement layer bitstream, the third demultiplexing unit 1065 separates N-bit 4:2:0 compression data and chrominance compression data. The N-bit 4:2:0 compression data is provided to the fifth decoding unit 1040, and the chrominance compression data is provided to the seventh decoding unit 1070.

By decoding the chrominance compression data provided by the third demultiplexing unit 1030, the seventh decoding unit 1070 obtains a quantization level ($LEVEL_{N-C4}$) of a chrominance component. By reverse-quantizing the quantization level ($LEVEL_{N-C4}$) of the chrominance component with the extended quantization parameter ($QP_N$), the seventh decoding unit 1070 restores a chrominance component.

The synthesis unit 1080 receives inputs of a luminance component from the fifth decoding unit 1040 and a chrominance component from the seventh decoding unit 1050 forming an N-bit 4:2:0 image, and generates an N-bit 4:2:2 restoration image for an inter mode.

Here, in each decoding process, entropy decoding of the quantization level may be performed before the decoding process or inverse DCT of the quantization level may be performed after the decoding process.

Figure 11:
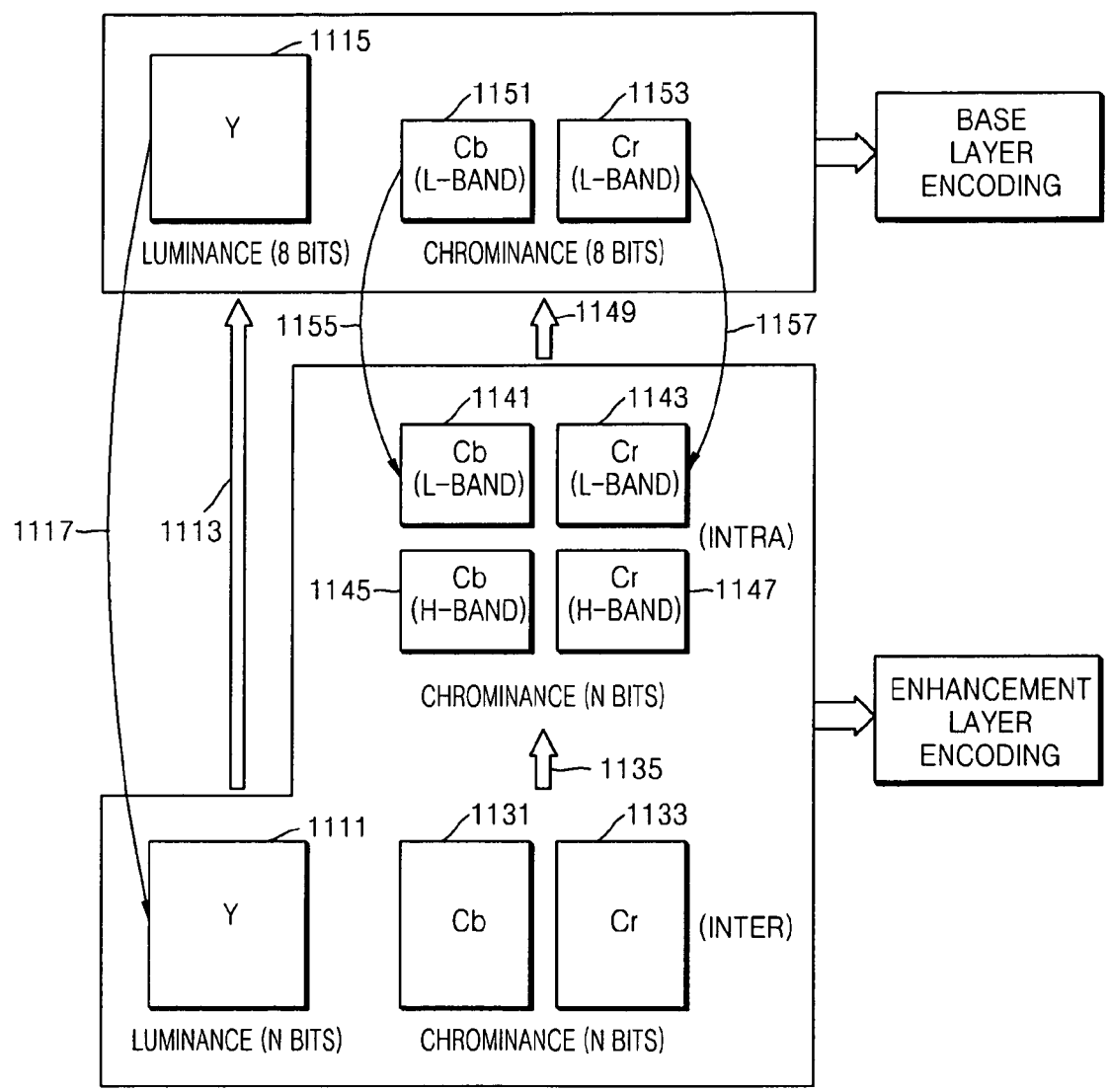
FIG. 11 explains structures of an 8-bit 4:2:0 image, which is encoded in a base layer, and an N-bit 4:2:2 image, which is encoded in an enhancement layer in the video encoding apparatus illustrated in FIG. 9, according to an embodiment of the present invention.

FIG. 11 explains structures of an 8-bit 4:2:0 image which is encoded in a base layer, and an N-bit 4:2:2 image which is encoded in an enhancement layer in the video encoding apparatus illustrated in FIG. 9, according to an embodiment of the present invention.

Referring to FIG. 11, operation 1113 for truncation of a luminance component 1111 of an N-bit 4:2:2 image is performed, thereby a luminance component 1115 is refined to a bit-depth of 8 bits. The luminance component 1115 is provided in order to obtain a prediction value of the luminance component 111 in the future in operation 1117.

If the encoding mode is an intra mode, operation 1135 for vertical analysis filtering of chrominance components 1131 and 1133 of the N-bit 4:2:2 image is performed, thereby separating low frequency band chrominance components 1141 and 1143 and high frequency band chrominance components 1145 and 1147. By performing operation 1149 for truncation of the low frequency band chrominance components 1141 and 1143, low frequency band chrominance components 1151 and 1153, refined to a bit-depth of 8 bits, are formed. In order to obtain prediction values of the low frequency band chrominance components 1141 and 1143 in the future, the low frequency band chrominance components 1151 and 1153 are provided in operations 1155 and 1157. If the encoding mode is an intra mode, the luminance component 1115 and the chrominance components 1151 and 1153 form an 8-bit 4:2:0 image and are encoded in order to generate a bitstream, which is transmitted as a base layer. Prediction values of the luminance component 1111 and the chrominance components 1141 and 1143 form an N-bit 4:2:0 image, and are encoded in order to generate a bitstream, which is transmitted as an enhancement layer together with the chrominance components 1145 and 1147.

Meanwhile, if the encoding mode is an inter mode, down-sampling of the chrominance components 1131 and 1133 of the N-bit 4:2:2 image is performed, thereby forming a chrominance component of an N-bit 4:2:0 image. By performing truncation of the chrominance component of the N-bit 4:2:0 image, a chrominance component refined to a bit-depth of 8 bits is formed. Meanwhile, the luminance component 1115 and the down-sampled chrominance component form an 8-bit 4:2:0 image, and are encoded in order to generate a bitstream to be transmitted as a base layer. Meanwhile, the luminance component 1111 is encoded with the chrominance components in order to generate a bitstream to be transmitted as an enhancement layer.

Figure 12A:
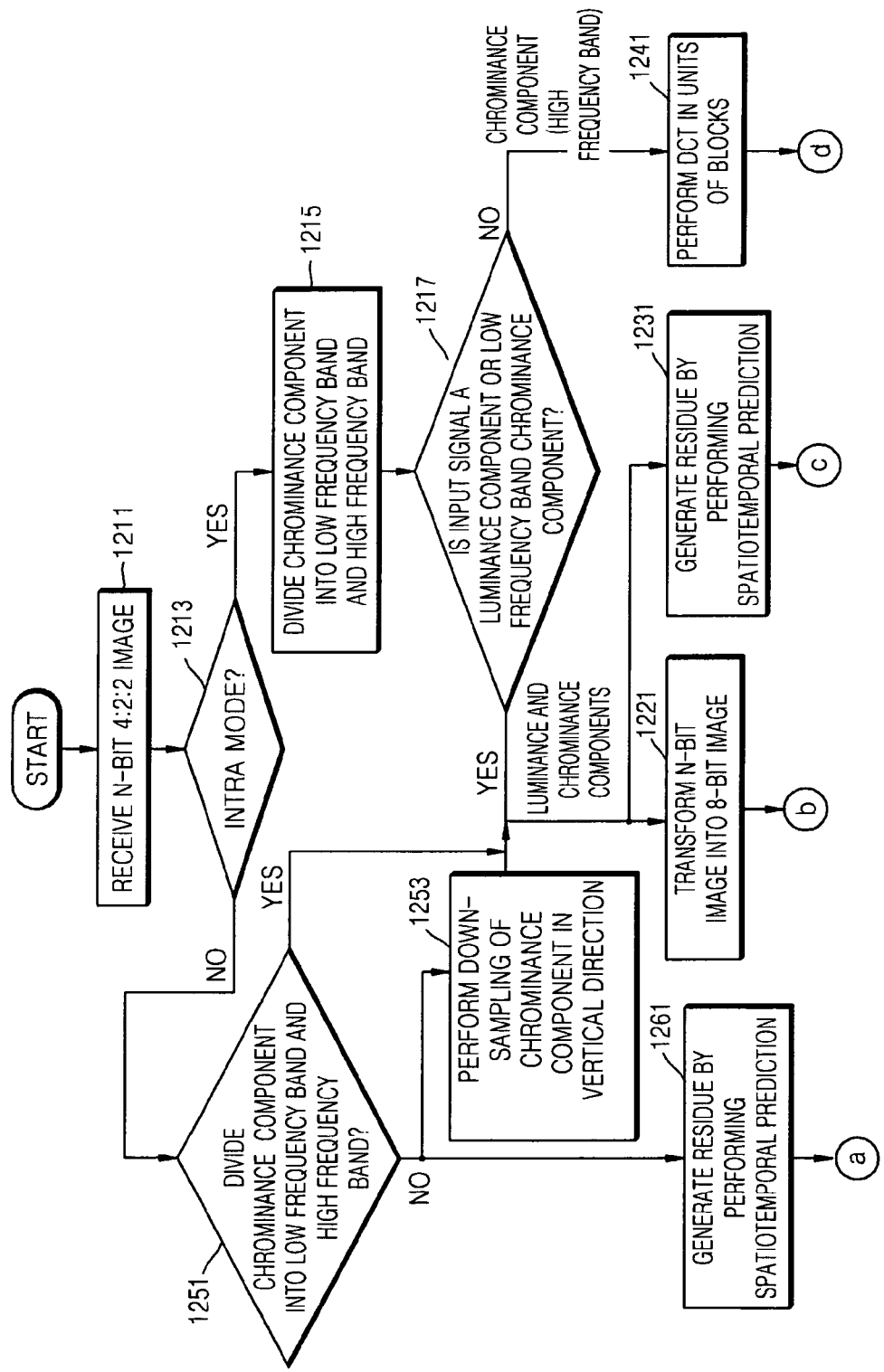
FIG. 12 explains an operation of a video encoding method, according to another embodiment of the present invention.
Figure 12B:
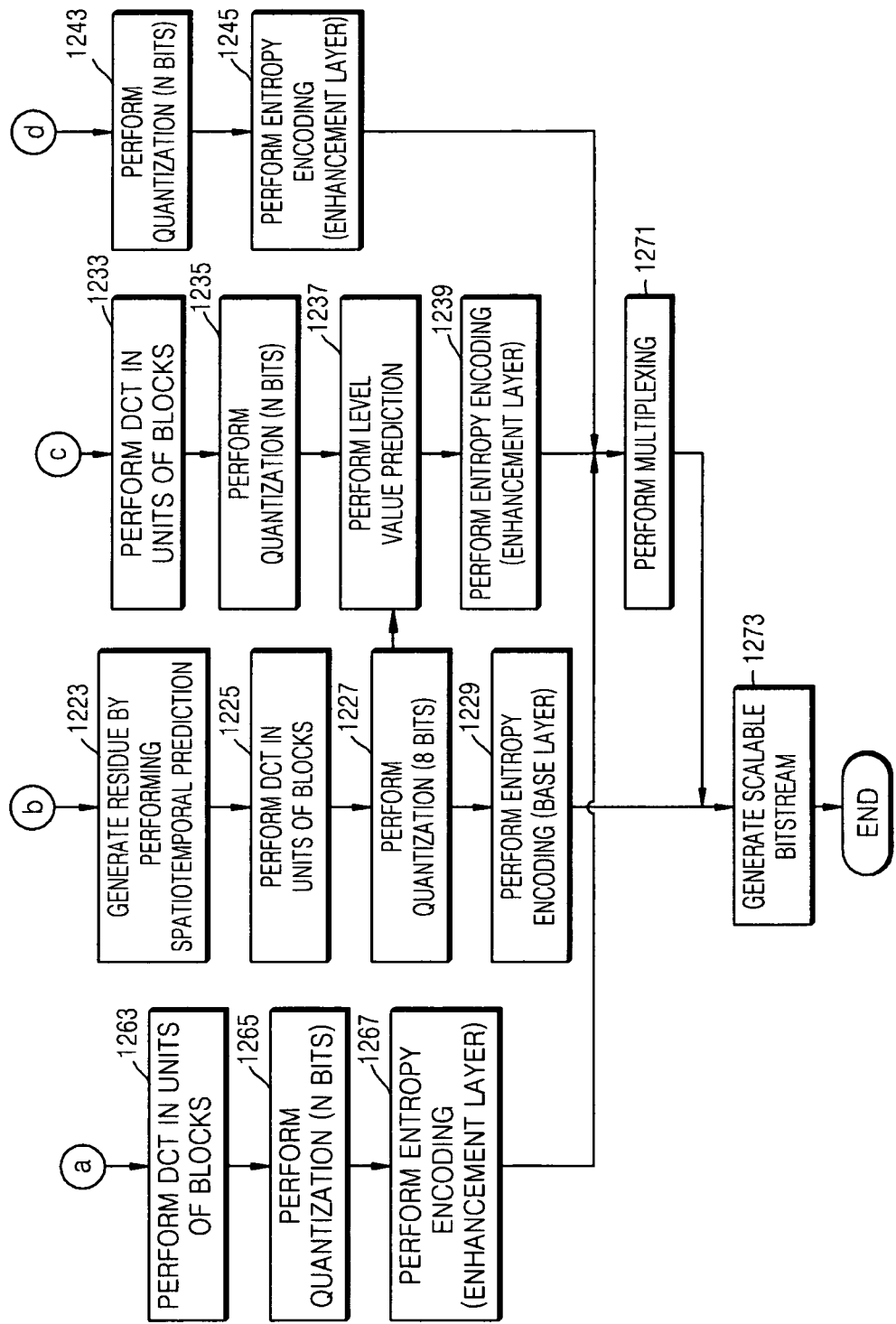

FIG. 12 explains an operation of a video encoding method, according to another embodiment of the present invention.

Referring to FIG. 12, an N-bit 4:2:2 image is received in operation 1211.

In operation 1213, it is determined whether the encoding mode of the received N-bit 4:2:2 image is an inter mode or an intra mode.

In operation 1215, if the encoding mode is an intra mode, the chrominance component of the N-bit 4:2:2 image is divided into a low frequency band and a high frequency band. In this case, wavelet analysis filtering of the chrominance component may be performed in the vertical direction, thereby dividing the frequency bands.

In operation 1217, it is determined whether an input signal is a luminance component or a low frequency band chrominance component. According to the result of the determination in operation 1217, dualistic encoding of the luminance component and the low frequency band chrominance component is performed, thereby generating compression data to be included in a base layer and compression data to be included in an enhancement layer. Meanwhile, according to the result of the determination in operation 1217, encoding of the high frequency band chrominance component is separately performed, thereby generating compression data included in an enhancement layer. This will now be explained in more detail.

In operations 1221 through 1229, if the encoding mode is an intra mode, 8-bit 4:2:0 encoding of the luminance component and the low frequency band chrominance is performed, thereby generating encoded data for a base layer. In operation 1221, the N-bit image is transformed into an 8-bit image. In this case, truncation of (N−8) bits from the least significant bit in lower bits of the N-bit image is performed. In operation 1223, spatio-temporal prediction of the 8-bit image is performed, thereby generating a residue image. In operation 1225, DCT of the residue image is performed in units of blocks. In operation 1227, quantization of DCT coefficients is performed with a quantization parameter obtained by multiplying a base quantization parameter corresponding to a bit-depth of 8 bits, by $2^{N-8}$. In operation 1229, entropy encoding of a base quantization level obtained as a result of the quantization is performed, and compression data obtained as a result of the entropy encoding and the base quantization parameter form a base layer bitstream.

Meanwhile, operations 1221 through 1229 are also applied when the encoding mode is an inter mode, and in that case, the luminance component and the down-sampled chrominance component are encoded.

In operations 1231 through 1239, if the encoding mode is an intra mode, N-bit 4:2:0 encoding of the luminance component and the low frequency band chrominance component is performed, thereby generating compression data for an enhancement layer. In operation 1231, spatio-temporal prediction of the N-bit image is performed, thereby generating a residue image. In operation 1233, DCT of the residue image is performed in units of blocks. In operation 1235, quantization of DCT coefficients is performed with an extended quantization parameter corresponding to a bit-depth of N bits. In operation 1237, the bit-depth of a base quantization level obtained as a result of the quantization in operation 1227 is refined, and then, the difference between extended quantization levels obtained as a result of the quantization in operation 1235, that is, a predicted quantization level, is obtained. In operation 1239, entropy encoding of the predicted quantization level is performed, and compression data obtained as a result of the entropy encoding and a refined quantization parameter for obtaining an extended quantization parameter are provided in order to form an enhancement layer bitstream. Meanwhile, operations 1231 through 1239 are also applied when the encoding mode is an inter mode, and in that case, the luminance component is encoded.

Operations 1241 through 1245 are applied only when the encoding mode is an intra mode. In operations 1241 through 1245, N-bit 4:2:2 encoding of the high frequency band chrominance component is performed, thereby generating compression data for an enhancement layer. In operation 1241, DCT of the high frequency band chrominance component is performed in units of blocks. In operation 1243, quantization of DCT coefficients is performed with an extended quantization parameter corresponding to a bit-depth of N bits. In operation 1245, entropy encoding of the extended quantization level obtained as a result of the quantization is performed, and compression data obtained as a result is provided in order to form an enhancement layer bitstream.

In operation 1251, if the encoding mode is an inter mode, it is determined whether an input signal is a luminance component or a chrominance component. For the luminance component, operations 1221 through 1229 and operations 1231 through 1239 are performed, thereby generating compression data to be included in a base layer and an enhancement layer.

In operation 1253, if the encoding mode is an inter mode and the input signal is a chrominance component, down-sampling by a factor of 2 is performed in the vertical direction. Operations 1221 through 1229 are performed with the down-sampled chrominance component, thereby generating compression data to be included in a base layer.

Operations 1261 through 1267 are applied only when the encoding mode is an inter mode. In operations 1261 through 1267, N-bit 4:2:2 encoding of a chrominance component is performed, thereby generating compression data for an enhancement layer. In operation 1261, spatio-temporal prediction of a chrominance component is performed, thereby generating a residue image. In operation 1263, DCT of the residue image is performed in units of blocks. In operation 1265, quantization of DCT coefficients is performed with an extended quantization parameter corresponding to a bit-depth of N bits. In operation 1267, entropy encoding of an extended quantization level obtained as a result of the quantization is performed, and compression data obtained as a result of the entropy encoding is provided in order to form an enhancement layer bitstream.

In operation 1271, if the encoding mode is an intra mode, the compression data corresponding to an N-bit 4:2:0 image obtained in operation 1239 and the compression data for the high frequency band chrominance component obtained in operation 1245 are multiplexed, thereby obtaining compression data corresponding to an N-bit 4:2:2 image and forming an enhancement layer bitstream for an intra mode. Meanwhile, in operation 1271, if the encoding mode is an inter mode, the compression data of the luminance component obtained in operation 1239 and the compression data for the chrominance component obtained in operation 1267 are multiplexed, thereby obtaining compression data corresponding to an N-bit 4:2:2 image and forming an enhancement layer bitstream for an inter mode.

In operation 1273, the base layer bitstream formed in operation 1229 and the enhancement layer bitstream formed in operation 1271 are combined, thereby generating a scalable bitstream.

Figure 13A:
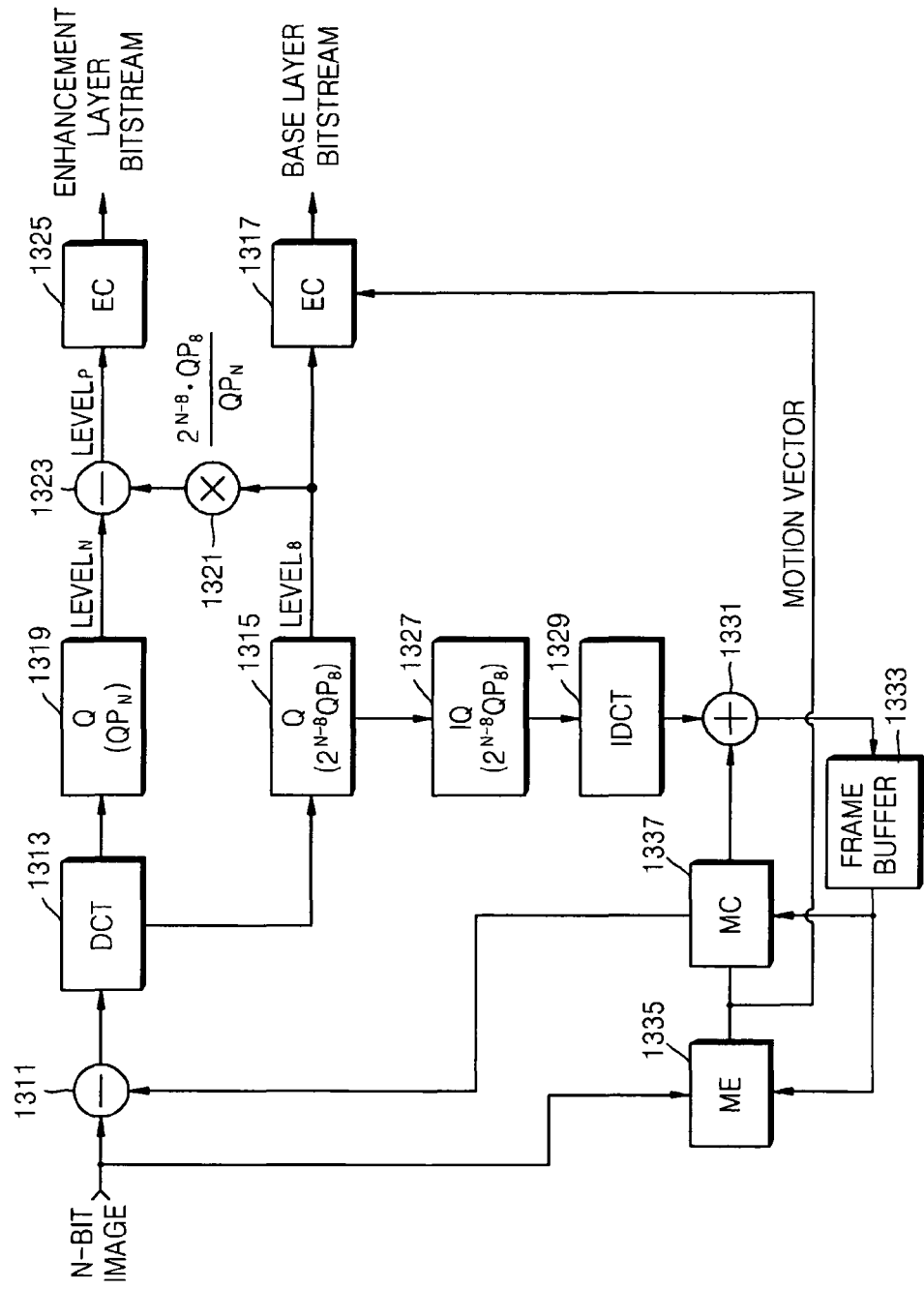
FIGS. 13A through 13D illustrate detailed structures of a first and second encoding unit illustrated in FIG. 2 or a fourth and fifth encoding unit illustrated in FIG. 9, according to an embodiment of the present invention.
Figure 13B:
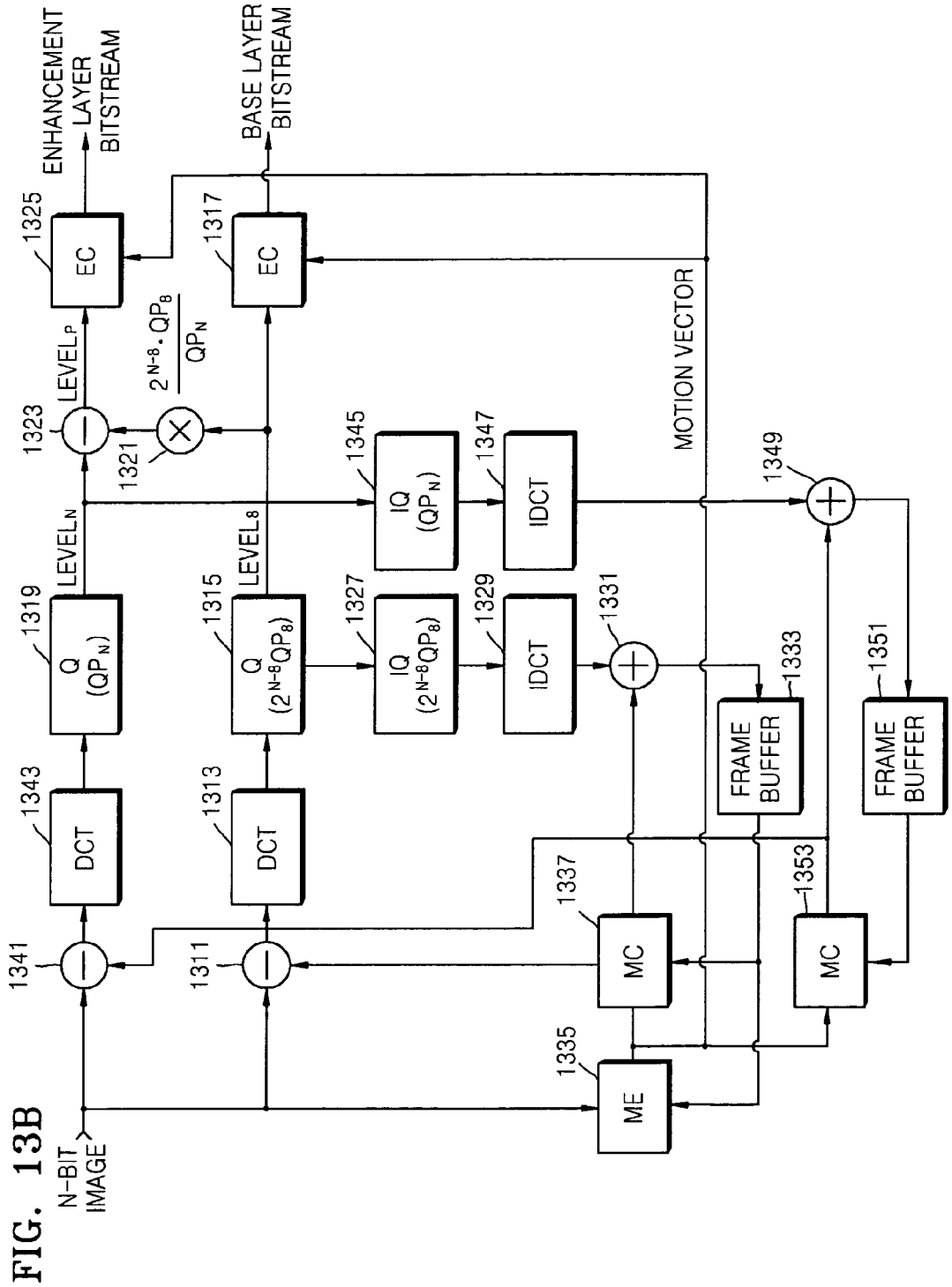
Figure 13C:
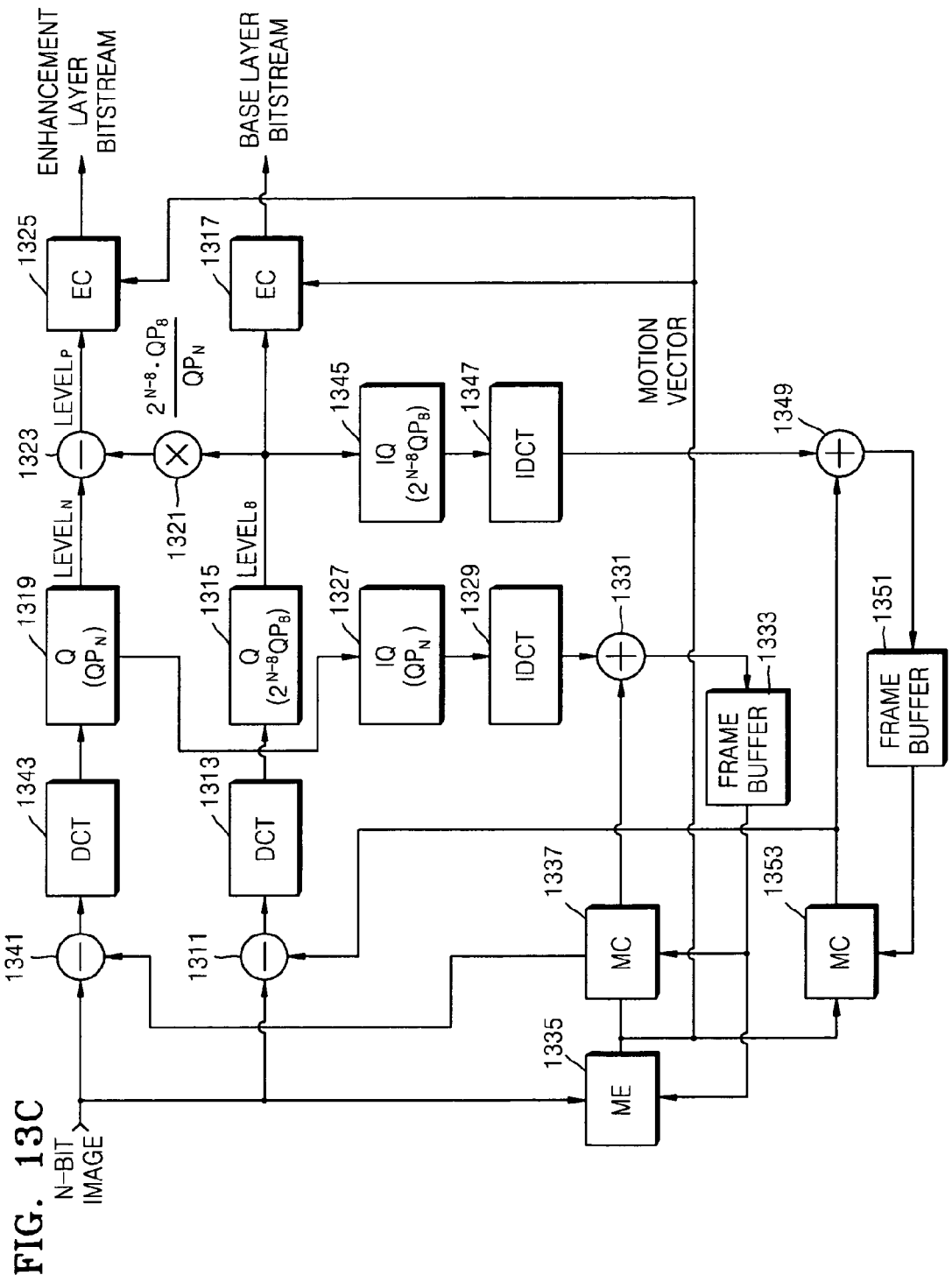

FIGS. 13A through 13C illustrate detailed structures of the first and second encoding unit 250 and 260 illustrated in FIG. 2 or the fourth and fifth encoding unit 940 and 950 illustrated in FIG. 9, according to an embodiment of the present invention.

In FIG. 13A, except for a second quantization unit 1319, a first bit-depth refinement unit 1321, a second subtraction unit 1323, and a second entropy encoding unit 1325, the remaining elements form the first encoding unit 250 or the fourth encoding unit 940. Meanwhile, a first subtraction unit 1311, a first transform unit 1313, the second quantization unit 1319, the first bit-depth refinement unit 1321, a second subtraction unit 1323, and the second entropy encoding unit 1325 form the second encoding unit 260 or the fifth encoding unit 950. The encoding unit illustrated in FIG. 13A has a structure in which the encoding unit performs motion estimation and motion compensation of a base layer, while DCT is performed in both the base layer and an enhancement layer.

Referring to FIG. 13A, the first transform unit 1313 generates transformation coefficients for a residue image between an N-bit restoration image, which is obtained by spatio-temporal prediction of an N-bit reference image, and an N-bit original image. In order to generate the transformation coefficients, a variety of video codecs, such as motion-compensated discrete cosine transformation (MC-DCT), can be used, and therefore a more detailed explanation will be omitted here. That is, the first subtraction unit 1311, the first transform unit 1313, a first quantization unit 1315, a first entropy encoding unit 1317, a first inverse quantization unit 1327, a first inverse transform unit 1329, a first addition unit 1331, a first frame buffer 1333, a first motion estimation unit 1335, and a first motion compensation unit 1337 forming the first encoding unit 250 or the fourth encoding unit 940 are the same as in an ordinary MC-DCT structure.

The first quantization unit 1315 quantizes a transformation coefficient provided by the first transform unit 1313 with a quantization parameter obtained by multiplying a base quantization parameter ($QP_8$) by $2^{N-8}$, and entropy-encodes the quantized transformation coefficient, that is, a base quantization level, thereby generating a base layer bitstream. More specifically, assuming that the transformation coefficient is coef, the base quantization level ($LEVEL_8$) can be expressed as given by Equation 8 below.

$$LEVEL_8 = \frac{abs(coef) + QP_8 \times 2^{(N-9)}}{QP_8 \times 2^{(N-8)}} \qquad \text{Equation 8}$$

The base quantization level ($LEVEL_8$) obtained from Equation 8 is directly entropy-encoded so that it can be restored in a conventional 8-bit video codec, and then, the result is transmitted as a base layer.

The second quantization unit 1319 quantizes the transformation coefficient provided by the first transform unit 1313 with the extended quantization parameter ($QP_N$) of Equation 2, and by entropy-encoding the quantized transformation coefficient, that is, the extended quantization level, the second quantization unit 1319 generates an enhancement layer bitstream.

More specifically, assuming that the transformation coefficient is coef, the extended quantization level ($LEVEL_N$) can be expressed as given by Equation 9 below.

$$LEVEL_N = \frac{abs(coef) + QP_N/2}{QP_N} \qquad \text{Equation 9}$$

The extended quantization level ($LEVEL_N$), obtained from Equation 9, is not directly entropy-encoded, but a residue of a quantization level obtained by performing prediction encoding with the base quantization level ($LEVEL_8$), that is, a predicted quantization level, is entropy-encoded. That is, since the base quantization level ($LEVEL_8$) is very similar to the extended quantization level ($LEVEL_N$), the difference between the base quantization level ($LEVEL_8$) and the extended quantization level ($LEVEL_N$) is obtained by the first bit-depth refinement unit 1321 and the second subtraction unit 1323, and is determined as a predicted quantization level. More specifically, the first bit-depth refinement unit 1321 refines the dynamic range of each quantization level, and outputs a refined quantization level ($LEVEL_N'$) by making the base quantization level ($LEVEL_8$) have the same dynamic range as that of the extended quantization level ($LEVEL_N$) according to Equation 10 below.

$$LEVEL_N' = \left\lfloor \frac{QP_8 \times 2^{(N-8)}}{QP_N} \times LEVEL_8 \right\rfloor \qquad \text{Equation 10}$$

The second subtraction unit 1323 obtains the difference between the extended quantization level ($LEVEL_N$) and the refined quantization level ($LEVEL_N'$), and generates a predicted quantization level ($LEVEL_P$) as given by Equation 11 below.

$$LEVEL_P = LEVEL_N - LEVEL_{N'} \qquad \text{Equation 11}$$

By entropy-encoding the predicted quantization level ($LEVEL_P$) and transmitting it as an enhancement layer, the amount of data included in the enhancement layer bitstream can be greatly reduced.

The structure illustrated in FIG. 13B is obtained by adding a third subtraction unit 1341, a second transform unit 1343, a second inverse quantization unit 1345, a second inverse quantization unit 1347, a second addition unit 1349, a second frame buffer 1351, and a second motion compensation unit 1353, to the structure illustrated in FIG. 13A. In the structure, motion compensation of each of a base layer and an enhancement layer is performed using a motion vector that is obtained by performing motion estimation in relation to a base layer, and DCT is separately performed in the base layer and in the enhancement layer.

The structure illustrated in FIG. 13C is obtained by adding a third subtraction unit 1341, a second transform unit 1343, a second inverse quantization unit 1345, a second inverse quantization unit 1347, a second addition unit 1349, a second frame buffer 1351, and a second motion compensation unit 1353 to the structure illustrated in FIG. 13A. In the structure, motion compensation of each of a base layer and an enhancement layer is performed by using a motion vector that is obtained by performing motion estimation in relation to an enhancement layer, and DCT is separately performed in the base layer and in the enhancement layer.

Figure 13D:
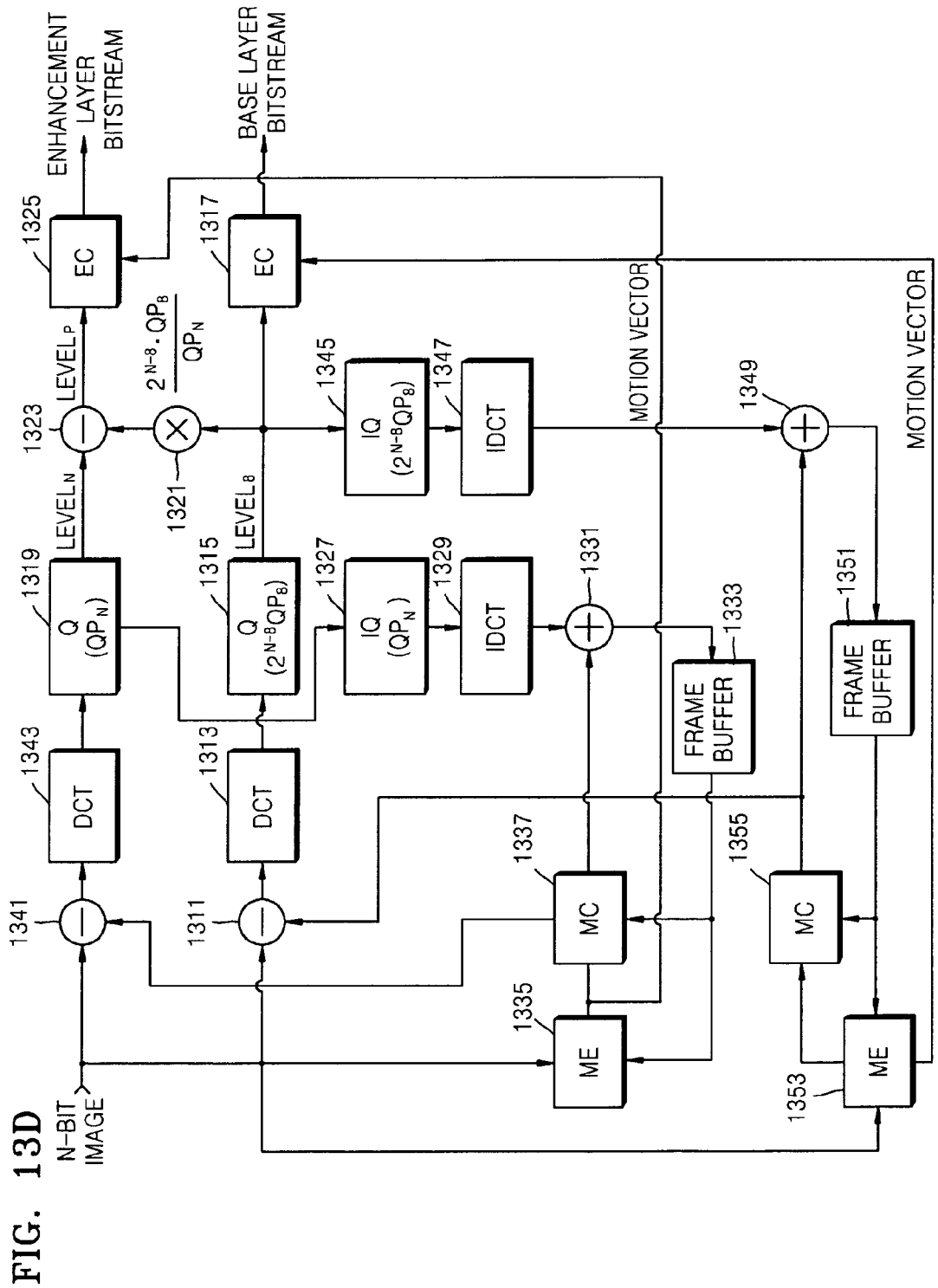

The structure illustrated in FIG. 13D is obtained by adding a third subtraction unit 1341, a second transform unit 1343, a second inverse quantization unit 1345, a second inverse quantization unit 1347, a second addition unit 1349, a second frame buffer 1351, and a second motion compensation unit 1353 to the structure illustrated in FIG. 13A. In the structure, by using a motion vector obtained by performing motion estimation in relation to a base layer, motion compensation for the base layer is performed, and by using a motion vector obtained by performing motion estimation in relation to an enhancement layer, motion compensation for the enhancement layer is performed. DCT is separately performed in the base layer and in the enhancement layer.

Figure 14:
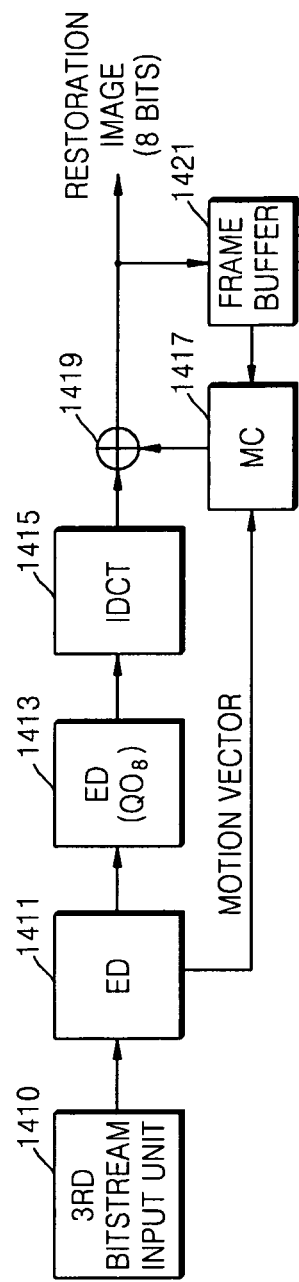
FIG. 14 illustrates a detailed structure of an ordinary 8-bit decoding unit.

FIG. 14 illustrates a detailed structure of an ordinary 8-bit decoding apparatus. The decoding apparatus includes a third bitstream input unit 1410, a first entropy decoding unit 1411, a second inverse quantization unit 1413, a second inverse quantization unit 1415, a second motion compensation unit 1417, a second addition unit 1419, and a second frame buffer 1421. Except for an inverse quantization parameter used in an inverse quantization process, the decoding apparatus has the same structure as the detailed structure of the first decoding unit 320 illustrated in FIG. 3, or the fourth decoding unit 940 illustrated in FIG. 10, and the same structure as an ordinary MC-DCT structure. Accordingly, a more detailed explanation of its operation will be omitted here.

In FIG. 14, the third bitstream input unit 1410 determines whether an input bitstream is a scalable bitstream or a non-scalable bitstream, by confirming an enhancement layer identifier. If the input bitstream is a non-scalable bitstream, the bitstream is provided directly to the first entropy decoding unit 1411. If the input bitstream is a scalable bitstream, a base layer bitstream is separated and provided to the first entropy decoding unit 1411.

The second inverse quantization unit 1413 restores a transformation coefficient (coef$_8$) by using a base quantization parameter (QP$_8$) as given by Equation 12 below.

$$\text{coef}_8 = \text{LEVEL}_8 \times QP_8 \qquad \text{Equation 12}$$

The second inverse transform unit 1415 performs inverse transformation of the restored transformation coefficient (coef$_8$), thereby restoring a residue image, and the second motion compensation unit 1417 generates a prediction image, by performing motion compensation for an 8-bit reference image stored in the second frame buffer 1421. The second addition unit 1419 adds the prediction image to the restored residue image, thereby generating a final 8-bit restoration image.

Figure 15:
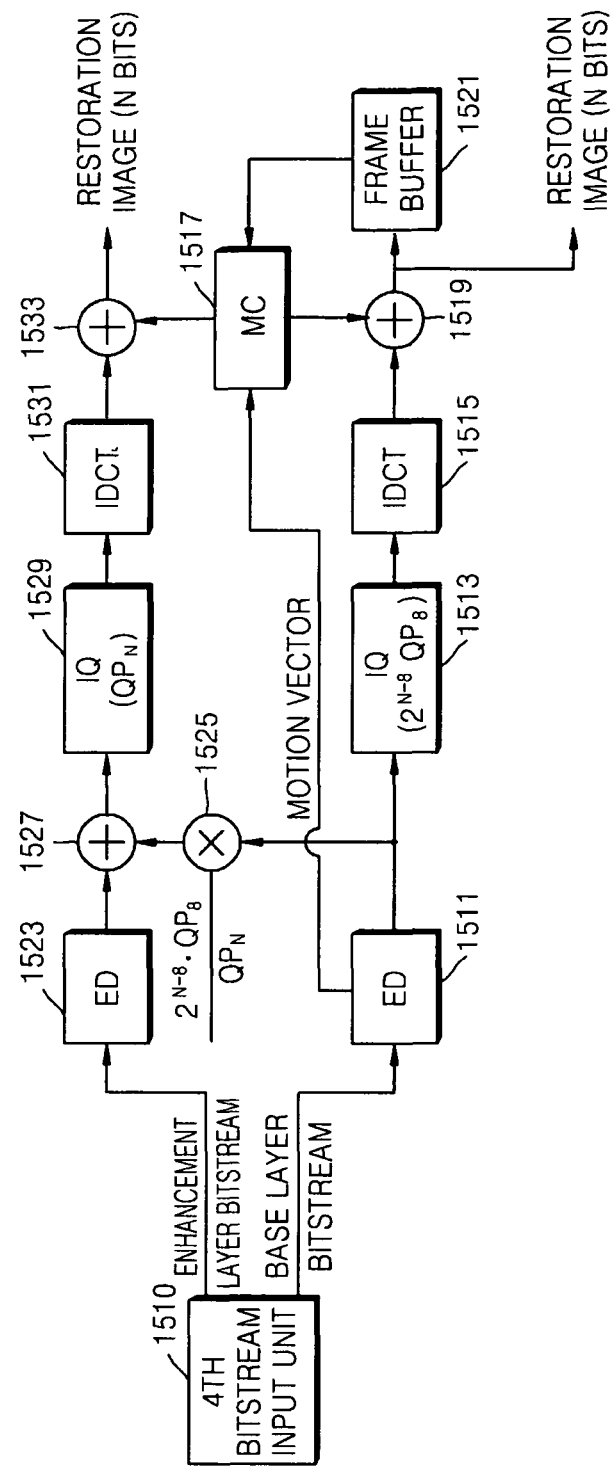
FIG. 15 illustrates detailed structures of a first and second decoding unit illustrated in FIG. 3 or a fourth and fifth decoding unit illustrated in FIG. 10, according to an embodiment of the present invention.

FIG. 15 illustrates detailed structures of the first and second decoding unit 320 and 330 illustrated in FIG. 3 or the fourth and fifth decoding unit 940 and 950 illustrated in FIG. 10, according to an embodiment of the present invention. The structures illustrated in FIG. 15 have structures corresponding to the structures, in reverse order, of the first and second encoding unit 250 and 260 illustrated in FIG. 13. In FIG. 15, a fourth bitstream input unit 1510, a second entropy decoding unit 1511, a third inverse quantization unit 1513, a third inverse transform unit 1515, a third motion compensation unit 1517, a third addition unit 1519, and a third frame buffer 1521 form the first decoding unit 320 or the fourth decoding unit 940. Meanwhile, a fourth bitstream input unit 1510, a third entropy decoding unit 1523, a second bit-depth refinement unit 1525, a fourth addition unit 1527, a fourth inverse quantization unit 1529, a fourth inverse transform unit 1531, and a fifth addition unit 1533 form the second decoding unit 330 or the fifth decoding unit 950.

Referring to FIG. 15, the fourth bitstream input unit 1510 examines whether or not a bitstream includes an enhancement layer identifier, and if the bitstream does not include an enhancement layer identifier, the fourth bitstream input unit 1510 provides the input non-scalable bitstream to the second entropy decoding unit 1511 without any change. Meanwhile, if the bitstream includes an enhancement layer identifier, a base layer bitstream and an enhancement layer bitstream are separated from the input scalable bitstream and provided to the second entropy decoding unit 1511 and the third entropy decoding unit 1523, respectively.

A base layer bitstream or a non-scalable bitstream provided by the fourth bitstream input unit 1510 is decoded through the second entropy decoding unit 1511, the third inverse quantization unit 1513, the third inverse transform unit 1515, the third motion compensation unit 1517, the third addition unit 1519, and the third frame buffer 1521, and an N-bit restoration image is generated. The generated N-bit restoration image is used as a reference image when an enhancement layer bitstream is decoded.

The third entropy decoding unit 1523 performs entropy-decoding of the enhancement layer bitstream provided by the fourth bitstream input unit 1510, thereby restoring a predicted quantization level (LEVEL$_P$). The second bit-depth refinement unit 1525 refines the bit-depth of the base quantization level (LEVEL$_8$) restored in the second entropy decoding unit 1511, and generates a refined quantization level (LEVEL$_N$'). The fourth addition unit 1527 adds the predicted quantization level (LEVEL$_P$) and the refined quantization level (LEVEL$_N$') as illustrated in Equation 13 below, and thus generates an extended quantization level (LEVEL$_N$).

$$\text{LEVEL}_N = \text{LEVEL}_P + \text{LEVEL}_{N'} \qquad \text{Equation 13}$$

The fourth inverse quantization unit 1529 performs inverse-quantization of the extended quantization level (LEVEL$_N$) with the extended quantization parameter (QP$_N$) as illustrated in Equation 14 below, thereby restoring a transformation coefficient (coef$_N$).

$$\text{coef}_N = \text{LEVEL}_N \times QP_N \qquad \text{Equation 14}$$

The fourth inverse transform unit 1531 performs inverse transformation of the restored transformation coefficient (coef$_N$), thereby restoring a residue image. The third motion compensation unit 1517 performs motion compensation for an N-bit reference image stored in the third frame buffer 1521, using a motion vector, and generates a prediction image. The fifth addition unit 1533 adds the prediction image to the restored residue image, thereby generating a final N-bit restoration image.

Figure 16:
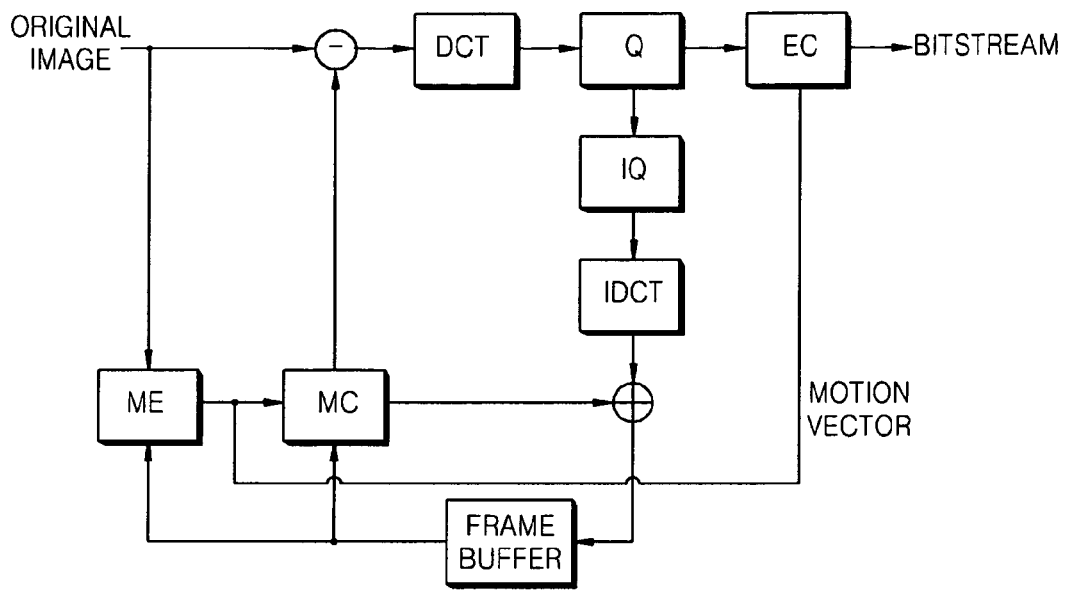
FIG. 16 illustrates a structure of an 8-bit or N-bit encoding unit, according to an embodiment of the present invention.

FIG. 16 illustrates a structure of an 8-bit or N-bit encoding unit, according to an embodiment of the present invention, and corresponds to an embodiment of detailed elements of the first encoding unit 250 illustrated in FIG. 2, or the fourth encoding unit 940 or the seventh encoding unit 970 illustrated in FIG. 9.

Figure 17:
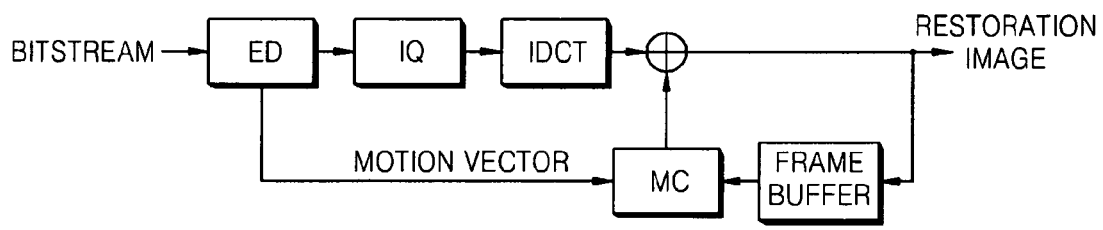
FIG. 17 illustrates a structure of an 8-bit or N-bit decoding unit, according to an embodiment of the present invention.

FIG. 17 illustrates a structure of an 8-bit or N-bit decoding unit, according to an embodiment of the present invention, and corresponds to an embodiment of detailed elements of the first decoding unit 320 illustrated in FIG. 3, or the fourth decoding unit 1020 or the seventh decoding unit 1070 illustrated in FIG. 10.

Figure 18:
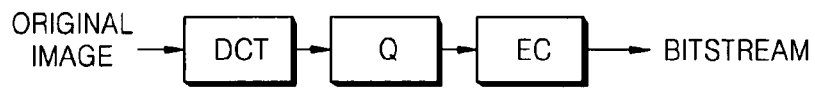
FIG. 18 illustrates an 8-bit or N-bit intra encoding unit, according to an embodiment of the present invention.

FIG. 18 illustrates an 8-bit or N-bit intra encoding unit, according to an embodiment of the present invention, and corresponds to an embodiment of detailed elements of the third encoding unit 270 illustrated in FIG. 2, or the sixth encoding unit 960 illustrated in FIG. 9.

Figure 19:
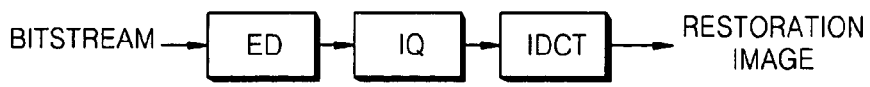
FIG. 19 illustrates an 8-bit or N-bit intra decoding unit, according to an embodiment of the present invention.

FIG. 19 illustrates an 8-bit or N-bit intra decoding unit, according to an embodiment of the present invention, and corresponds to an embodiment of detailed elements of the third decoding unit 340 illustrated in FIG. 3, or the sixth decoding unit 1060 illustrated in FIG. 10.

The video codec applied in the embodiments described above indicates an MC-DCT video codec which is widely used in MPEG-2, MPEG-4, H.264, and the like, but the present invention is not limited to this, and according to applications, modification or variation can be made. Meanwhile, since the applied video codec is widely known to those of ordinary skill in the art, a detailed explanation of the operations of known elements, except those elements which are modified or added by the present invention, are omitted here.

In the embodiments described above, the structure of a scalable bitstream supports two different codecs, in which at least one of the bit-depth and video format of one codec is different from that of the other codec, based on embodiments formed by one base layer bitstream and one enhancement layer bitstream. However, by placing a plurality of enhancement layer bitstreams, it is also possible to support more than two codecs. Also, in the present embodiments, an example in which the base bit-depth value is greater than the extended bit-depth value is explained. However, even when the changing direction of the bit-depth is different, that is, when the base bit-depth value is less than the extended bit-depth value, designs can be varied in a number of ways. Also, although additional quantization information such as a refined quantization parameter (R) is assigned in each picture level in the present embodiments, a refined quantization parameter (R) can be assigned in each slice level, each macroblock level, or each block level when necessary.

As described here, in order to provide a new video codec guaranteeing forward compatibility as well as backward compatibility, a video encoding apparatus according to the present invention generates a scalable bitstream formed with a base layer bitstream and an enhancement layer bitstream. A conventional basic decoder, which receives the scalable bitstream, performs decoding by using a base layer bitstream obtained from the scalable bitstream. A video decoding apparatus according to the present invention performs decoding by using both the base layer bitstream and the enhancement layer bitstream. In this way, the video codec according to the present invention can harmonize and thereby coexist with conventional video codecs. Accordingly, the present invention has an advantage in that a conventional window media video (WMV) codec or a VC-1 codec can be used together with a video codec supporting a new bit-depth.

Since the video codec according to one or more embodiments of the present invention provides forward compatibility as described above, the present invention can be employed in conventional basic video codes as well as improved video codecs mounted on wired or wireless electronic devises, such as mobile phones, DVD players, portable music players, or car audio systems. In this way, the present invention can be applied to a variety of video codecs irrespective of supported bit-depth or video formats.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, DVDs, Blu-ray disks), and transmission media such, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention have been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A video encoding method of generating a scalable bitstream formed with a base layer bitstream and an enhancement layer bitstream in order to provide forward compatibility, the method comprising:

reconstructing an image having an extended bit-depth and an extended video format into an image having a base bit-depth and a base video format, encoding the reconstructed image, and as a result of the encoding of the image having the base bit-depth and the base video format, generating a base layer bitstream; and reconstructing the image having the extended bit-depth and extended video format into an image having the extended bit-depth and the base video format, and by using the result of the encoding of the image having the base bit-depth and the base video format, encoding the image having the extended bit-depth and the base video format, and generating an enhancement layer bitstream including a result of the encoding of the image having the extended bit-depth and the base video format and additional chrominance component data required for the extended video format, wherein the result of the encoding of the image having the base bit-depth and the base video format includes a base quantization level and a base quantization parameter, and wherein in the encoding the image having the extended bit depth and the base video format comprises generating an extended quantization level using an extended quantization parameter, the extended quantization parameter being derived by using the base quantization parameter and a refined quantization parameter that refines the difference between the base bit-depth and the extended bit-depth.

2. The method of claim 1, wherein in the generating of the base layer bitstream, a resolution of a chrominance component of the image having the extended bit-depth and the extended video format is reduced, and the bit-depths of a luminance component and the chrominance component whose resolution is adjusted are reduced, thereby reconstructing the image having the base bit-depth and the base video format.

3. The method of claim 2, wherein in the generating of the base layer bitstream, analysis filtering of the chrominance component of the image having the extended bit-depth and the extended video format is performed in a vertical direction, and a chrominance component of a low frequency band is determined as a chrominance component for the base video format.

4. The method of claim 2, wherein in the generating of the enhancement layer bitstream, analysis filtering of the chrominance component of the image having the extended bit-depth and the extended video format is performed in a vertical direction, and a chrominance component of a high frequency band is encoded, thereby generating the additional chrominance component data required for the extended video format.

5. The method of claim 2, wherein in the generating of the base layer bitstream, bits of lower importance are removed from the luminance component and the chrominance component whose resolution is adjusted, thereby reducing the bit-depth.

6. The method of claim 1, wherein in the generating of the base layer bitstream, the base layer bitstream is constructed by including the base quantization level, which is obtained by quantizing the image having the base bit-depth and the base video format with a quantization parameter obtained by multiplying the base quantization parameter by a predetermined number, and the base quantization parameter.

7. The method of claim 1, wherein in the generating of the enhancement layer bitstream, a predicted quantization level of the image having the extended bit-depth and the base video format is obtained by using the base quantization level, which is obtained by quantizing the image having the base bit-depth and the base video format, and by including the predicted quantization level, a quantization level of an additional chrominance component required for the extended video format, and the refined quantization parameter for refining the difference between the base bit-depth and the extended bit-depth, thereby constructing the enhancement layer bitstream.

8. The method of claim 1, wherein the scalable bitstream further comprises an enhancement layer identifier.

9. The method of claim 8, wherein the enhancement layer identifier is included in at least one of a sequence level, a group of pictures (GOP) level, a picture level, a macroblock level, and a block level of the base layer bitstream.

10. The method of claim 8, wherein the enhancement layer identifier is included in a reserved area existing in the base layer bitstream.

11. A video encoding apparatus for generating a scalable bitstream formed with a base layer bitstream and an enhancement layer bitstream in order to provide forward compatibility, the apparatus comprising:

a base layer encoding module reconstructing an image having an extended bit-depth and an extended video format into an image having a base bit-depth and a base video format, encoding the reconstructed image, and as a result of the encoding of the image having the base bit-depth and the base video format, generating a base layer bitstream; and an enhancement layer encoding module reconstructing the image having the extended bit-depth and extended video format into an image having the extended bit-depth and the base video format, and by using the result of the encoding of the image having the base bit-depth and the base video format, encoding the image having the extended bit-depth and the base video format, and generating an enhancement layer bitstream including a result of the encoding of the image having the extended bit-depth and the base video format and additional chrominance component data required for the extended video format, wherein the result of the encoding of the image having the base bit-depth and the base video format includes a base quantization level and a base quantization parameter, and wherein in the encoding, the image having the extended bit depth and the base video format comprises generating an extended quantization level using an extended quantization parameter, the extended quantization parameter being derived by using the base quantization parameter and a refined quantization parameter that refines the difference between the base bit-depth and the extended bit-depth.

* * * * *